United States Patent
Essert et al.

(10) Patent No.: US 12,411,860 B2
(45) Date of Patent: Sep. 9, 2025

(54) GENERATING SYNTHETIC TIME SERIES DATASETS HAVING ANOMALIES

(71) Applicant: Capital One Services, LLC, McLean, VA (US)

(72) Inventors: Justin Essert, Richmond, VA (US); Vannia Gonzalez Macias, Glen Allen, VA (US); Pratik Gandhi, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/517,557

(22) Filed: Nov. 22, 2023

(65) Prior Publication Data

US 2025/0165484 A1    May 22, 2025

(51) Int. Cl.
*G06F 16/2458* (2019.01)
*G06F 18/214* (2023.01)

(52) U.S. Cl.
CPC ........ *G06F 16/2477* (2019.01); *G06F 18/214* (2023.01)

(58) Field of Classification Search
CPC ................ G06F 16/2477; G06F 18/214
See application file for complete search history.

(56) References Cited

U.S. PATENT DOCUMENTS

| | | | |
|---|---|---|---|
| 2016/0019271 A1* | 1/2016 | Ma | G06F 16/955 707/756 |
| 2020/0012933 A1* | 1/2020 | Truong | G06F 16/906 |
| 2021/0081261 A1* | 3/2021 | Walters | G06N 5/00 |
| 2021/0319081 A1* | 10/2021 | Wen | G06F 11/3452 |
| 2023/0024796 A1* | 1/2023 | Hazard | G06N 5/04 |
| 2024/0152735 A1* | 5/2024 | Wang | G06N 3/0442 |
| 2024/0242119 A1* | 7/2024 | Aggarwal | H04L 41/142 |

* cited by examiner

*Primary Examiner* — William P Bartlett
(74) *Attorney, Agent, or Firm* — Foley & Lardner LLP

(57) ABSTRACT

Methods and systems are described herein for facilitating generation of synthetic datasets having anomalies. The system may receive a command to generate a synthetic time series dataset. The system may generate data points for components of the synthetic dataset, the components including a seasonality function, a trend function, and a noise function. The system may determine minimum and maximum changes relative to the variance of the noise data points. The system may generate anomalies by replacing values of one or more noise data points with values between the minimum and maximum changes. The system may then generate the synthetic time series dataset having anomalies by combining the seasonality data points, the trend data points, and the noise data points into corresponding time slots of the synthetic time series dataset.

20 Claims, 11 Drawing Sheets

GENERATING SYNTHETIC TIME SERIES DATASETS HAVING ANOMALIES

BACKGROUND

Machine learning models require large amounts of data on which to train and test. Reliable data is crucial for benchmarking models to ensure they are performing well. However, there is often insufficient available data for this purpose, and the available data may not be useful to every model. For example, certain models may be trained to recognize specific features within data, but those features may be missing from available datasets. As such, it is beneficial to generate synthetic datasets for training and benchmarking machine learning models.

SUMMARY

Methods and systems are described herein for generating synthetic time series datasets. In particular, the methods and systems facilitate generation of unique synthetic datasets for use in training and benchmarking machine learning models. For example, the generation of model synthetic datasets increases the amount of data that is available for machine learning models and thus facilitates the performance of machine learning models. Furthermore, real data is irregular and thus synthetic datasets may be more realistic if those datasets mimic irregularities of real data. Therefore, synthetic datasets may be more beneficial if they are more irregular. For example, certain machine learning models are trained to detect specific irregularities. It is thus beneficial that the synthetic datasets used to train and benchmark these models contain labeled irregularities.

To solve these technical problems, the methods and systems facilitate generation of synthetic time series datasets having labeled irregularities. For example, irregularities may include anomalies or change points. The methods and systems may generate unique synthetic time series datasets having labeled anomalies and/or change points for use in training, testing, or benchmarking models. For models generated to detect anomalies and/or change points, these labeled synthetic datasets provide a way to ensure that the models are performing well. Moreover, for unsupervised models, the increased amount of data on which to train is beneficial for model performance. Accordingly, the methods and systems overcome the aforementioned technical problems as well as provide an improved mechanism for facilitating training and benchmarking of machine learning models.

Some embodiments involve generating synthetic datasets from various components. The system may receive a command to generate a synthetic dataset, such as a time series dataset. The system may generate, for the synthetic time series dataset, multiple components from which to build the data. For example, the components may include seasonality, trend, noise, and/or other components. The system may generate the seasonality component by generating a first set of data points using a first harmonic function from a set of available harmonic functions. The system may generate the trend component by generating a second set of data points for the synthetic time series dataset using a first trend function from a set of available trend functions. The system may generate noise by generating a third set of data points using a first noise function of a set of noise-generating functions. In some embodiments, the system may scale one or more of the components to ensure that one component does not drown out another in the final synthetic dataset. For example, the system may scale one or more of the sets of data points to satisfy a ratio between components. The ratio may be predetermined or may be received with the command. By scaling the components, the system may ensure that each component contributes to the final synthetic dataset without drowning out the other components.

Some embodiments involve generating the synthetic time series dataset having anomalies. In particular, the system may generate the synthetic time series dataset using the first harmonic function, the first trend function, and the first noise function. The system may determine an amount of variance of the third set of data points (e.g., the noise component). The variance may be a difference between a highest data point and a lowest data point within the noise component. The system may then determine, based on user input received with the command to generate the synthetic dataset, a minimum anomaly variance and a maximum anomaly variance. The minimum anomaly variance may define a minimum change of anomalies relative to the variance of the noise component, and the maximum anomaly variance may define a maximum change of the anomalies relative to the variance of the noise component. For example, the minimum anomaly variance and maximum anomaly variance may define a range of variance within which to generate the anomalies. The system may generate one or more anomalies by replacing the values of one or more data points in the noise component with one or more values within the range of variance for anomalies (e.g., between the minimum anomaly variance and maximum anomaly variance). The system may then generate a synthetic time series dataset by combining corresponding data points generated for the seasonality, trend, and noise components. In particular, the system may combine the first set of data points, the second set of data points, and the third set of data points into corresponding time slots of the synthetic time series dataset. By doing so, the system may create a synthetic time series dataset having anomalies for use in training and benchmarking machine learning models.

Some embodiments involve generating the synthetic time series dataset having change points. In particular, the system may generate the synthetic time series dataset using the first harmonic function, the first trend function, and the first noise function. The system may modify the first trend function to a second trend function of the set of available trend functions. For example, modifying the first trend function may involve modifying a level or a slope associated with the first trend function. The system may generate a change point for the synthetic time series dataset by replacing, for a subset of consecutive time slots, corresponding data points of the trend component with a corresponding fourth set of data points generated using the second trend function. The system may then generate a synthetic time series dataset by combining corresponding data points generated for the seasonality, trend, and noise components. In particular, the system may combine the seasonality data points, the first trend data points, and the noise data points for corresponding time slots and may combine the seasonality data points, the second trend data points, and the noise data points for the subset of consecutive time slots. By doing so, the system may create a synthetic time series dataset having a change point for use in training and benchmarking machine learning models.

These processes may be used individually or in conjunction with each other and with any other processes for generating synthetic datasets. For example, some embodiments involve generating the synthetic time series dataset having anomalies and change points. In particular, the system may generate the synthetic time series dataset using the first harmonic function, the first trend function, and the first noise function. The system may generate one or more anomalies by replacing values of one or more data points in the noise component with one or more values within a range of variance for anomalies (e.g., between a minimum anomaly variance and a maximum anomaly variance). The system may generate a change point for the synthetic time series dataset by replacing, for a subset of consecutive time slots, corresponding data points of the trend component with a corresponding set of data points generated using a second trend function. The system may then generate a synthetic time series dataset by combining the corresponding data points generated for the seasonality, trend, and noise components. In particular, the system may combine the seasonality data points, the first trend data points, and the noise data points for corresponding time slots and may combine the seasonality data points, the second trend data points, and the noise data points for the subset of consecutive time slots. By doing so, the system may create a synthetic time series dataset having anomalies and a change point for use in training and benchmarking machine learning models.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
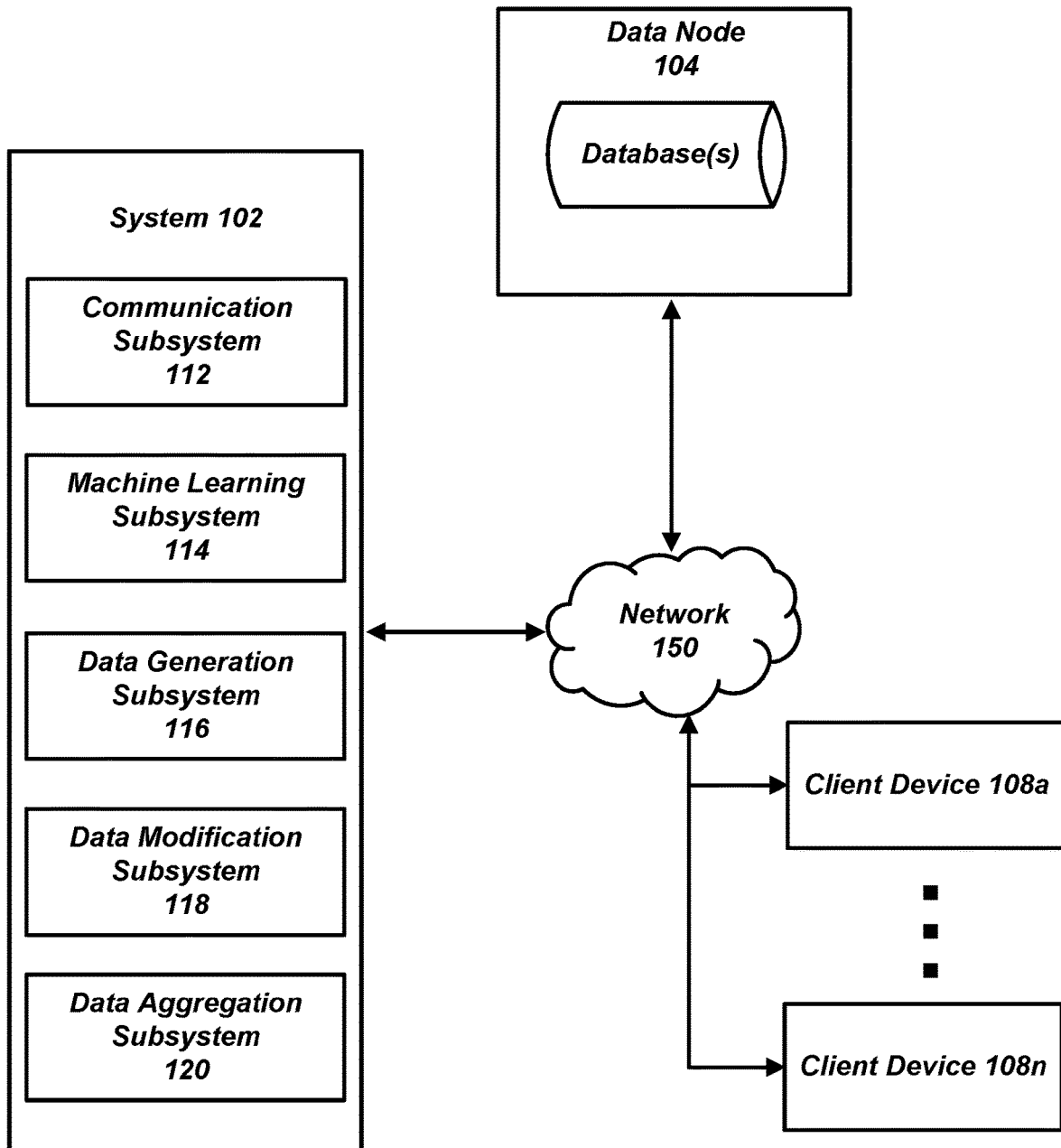
FIG. 1 shows an illustrative system for generating synthetic time series datasets, in accordance with one or more embodiments.

FIG. 1 shows an illustrative system 100 for generating synthetic time series datasets, in accordance with one or more embodiments. In some embodiments, system 100 may generate synthetic datasets having irregularities, such as anomalies or change points. As an illustrative example, a machine learning model may be trained to generate an alert in response to detecting anomalies in datasets that are input into the machine learning model. Over time, the performance of the model may require benchmarking. With limited data available for testing, system 100 may be unable to update or benchmark the model. Moreover, without labeled data, system 100 may have difficulty assessing the performance of the model on any available test data. Thus, synthetic datasets with labeled irregularities may be beneficial for training and benchmarking models.

Some embodiments involve generating synthetic datasets from various components. The system may receive a command to generate a synthetic dataset, such as a time series dataset. System 100 may generate, for the synthetic time series dataset, multiple components from which to build the data. For example, the components may include seasonality, trend, noise, or other components. System 100 may generate the seasonality component by generating a first set of data points using a first harmonic function from a set of available harmonic functions. System 100 may generate the trend component by generating a second set of data points for the synthetic time series dataset using a first trend function from a set of available trend functions. System 100 may generate noise by generating a third set of data points using a first noise function of a set of noise-generating functions. In some embodiments, system 100 may scale one or more of the components to ensure that one component does not drown out another in the final synthetic dataset. For example, system 100 may scale one or more of the sets of data points to satisfy a ratio between components. The ratio may be predetermined or may be received with the command.

Some embodiments involve generating the synthetic time series dataset with anomalies. In particular, system 100 may determine an amount of variance of the third set of data points (e.g., the noise component). The variance may be a difference between a highest data point and a lowest data point within the noise component. System 100 may then determine, based on user input received with the command to generate the synthetic dataset, a minimum anomaly variance and a maximum anomaly variance. The minimum anomaly variance may define a minimum change of anomalies relative to the variance of the noise component and the maximum anomaly variance may define a maximum change of the anomalies relative to the variance of the noise component. For example, the minimum anomaly variance and maximum anomaly variance may define a range of variance within which to generate the anomalies. System 100 may generate one or more anomalies by replacing (e.g., overriding) the values of one or more data points in the noise component with one or more values within the range of variance for anomalies (e.g., between the minimum anomaly variance and maximum anomaly variance). System 100 may then generate a synthetic time series dataset by combining the first set of data points, the second set of data points, and the third set of data points into corresponding time slots of the synthetic time series dataset.

Some embodiments involve generating the synthetic time series dataset with change points. In particular, system 100 may generate the synthetic time series dataset using the first harmonic function, the first trend function, and the first noise function. System 100 may modify the first trend function to a second trend function of the set of available trend functions. For example, modifying the first trend function may involve modifying a level or a slope associated with the first trend function. System 100 may generate a change point for the synthetic time series dataset by replacing, for a subset of consecutive time slots, corresponding data points of the trend component with a corresponding fourth set of data points generated using the second trend function. System 100 may then generate a synthetic time series dataset by combining corresponding data points generated for the seasonality, trend, and noise components. In particular, system 100 may combine the seasonality data points, the first trend data points, and the noise data points for corresponding time slots and may combine the seasonality data points, the second trend data points, and the noise data points for the subset of consecutive time slots. By doing so, system 100 may create a synthetic time series dataset having a change point for use in training and benchmarking machine learning models.

These processes may be used individually or in conjunction with each other and with any other processes for generating synthetic datasets. For example, some embodiments involve generating the synthetic time series dataset having anomalies and change points. In particular, the system may generate the synthetic time series dataset using a first harmonic function, a first trend function, and a first noise function. System 100 may generate one or more anomalies by replacing values of one or more data points in the noise component with one or more values within a range of variance for anomalies (e.g., between a minimum anomaly variance and a maximum anomaly variance). System 100 may generate a change point for the synthetic time series dataset by replacing, for a subset of consecutive time slots, corresponding data points of the trend component with a corresponding set of data points generated using a second trend function. System 100 may then generate a synthetic time series dataset by combining the corresponding data points generated for the seasonality, trend, and noise components. In particular, system 100 may combine the seasonality data points, the first trend data points, and the noise data points for corresponding time slots and may combine the seasonality data points, the second trend data points, and the noise data points for the subset of consecutive time slots.

As shown in FIG. 1, system 100 may include system 102, data node 104, and client devices 108a-108n. System 102 may include communication subsystem 112, machine learning subsystem 114, data generation subsystem 116, data modification subsystem 118, data aggregation subsystem 120, and/or other subsystems. In some embodiments, only one client device may be used, while in other embodiments, multiple client devices may be used. In some embodiments, client devices 108a-108n may be computing devices that may receive and send data via network 150. Client devices 108a-108n may be end-user computing devices (e.g., desktop computers, laptops, electronic tablets, smartphones, and/or other computing devices used by end users).

In some embodiments, system 102 may execute instructions for generation of synthetic datasets. System 102 may include software, hardware, or a combination of the two. For example, communication subsystem 112 may include a network card (e.g., a wireless network card and/or a wired network card) that is associated with software to drive the card. In some embodiments, system 102 may be a physical server or a virtual server that is running on a physical computer system. In some embodiments, system 102 may be configured on a user device (e.g., a laptop computer, a smart phone, a desktop computer, an electronic tablet, or another suitable user device).

Data node 104 may store various data, including one or more machine learning models, training data, communications, images, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, system 102 and data node 104 may reside on the same hardware and/or the same virtual server/computing device. Network 150 may be a local area network, a wide area network (e.g., the Internet), or a combination of the two.

System 102 (e.g., machine learning subsystem 114) may include one or more machine learning models. Machine learning subsystem 114 may include software components, hardware components, or a combination of both. For example, machine learning subsystem 114 may include software components (e.g., API calls) that access one or more machine learning models. Machine learning subsystem 114 may access training data, for example, in memory. In some embodiments, machine learning subsystem 114 may access the training data on data node 104 or on client devices 108a-108n. In some embodiments, the training data may include entries with corresponding features and corresponding output labels for the entries. Machine learning subsystem 114 may access production data, for example, in memory. Production may include the stage where a machine learning model, which has been trained, is deployed and put into practical use to make predictions or decisions. Production data may include real-world data based upon which the deployed model makes predictions or decisions. This data may be distinct from training data used to train and validate the model and may also be distinct from test data, used to evaluate the model's performance before deployment. In some embodiments, machine learning subsystem 114 may access the production data on data node 104 or on client devices 108a-108n. In some embodiments, the production data may include entries with corresponding features and corresponding output labels for the entries. In some embodiments, machine learning subsystem 114 may access one or more machine learning models. For example, machine learning subsystem 114 may access the machine learning models on data node 104 or on client devices 108a-108n.

Figure 2:
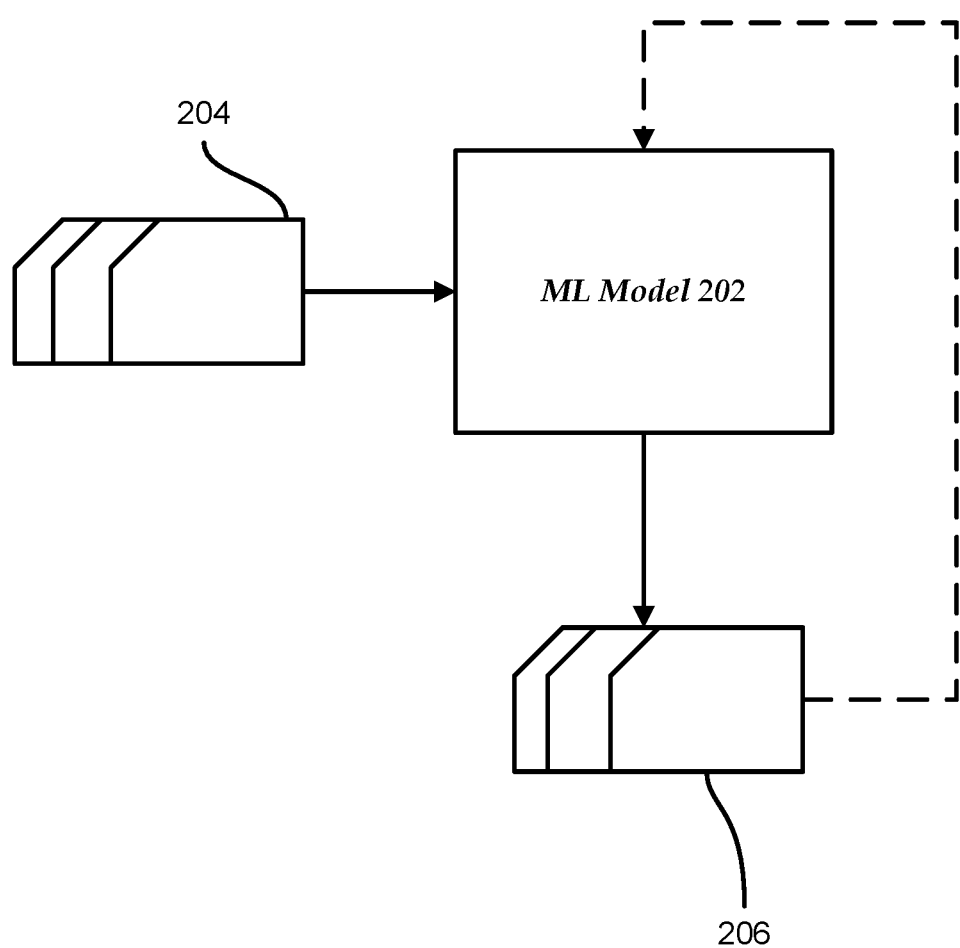
FIG. 2 illustrates an exemplary machine learning model, in accordance with one or more embodiments.

FIG. 2 illustrates an exemplary machine learning model 202, in accordance with one or more embodiments. The machine learning model may be trained to generate predictions, to detect certain features of datasets, or for another purpose. The machine learning model may be supervised or unsupervised. In some embodiments, machine learning model 202 may be included in machine learning subsystem 114 or may be associated with machine learning subsystem 114. Machine learning model 202 may take input 204 (e.g., datasets) and may generate outputs 206 (e.g., predictions). The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or a supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Components of FIGS. 1 and 2 may facilitate generation of synthetic datasets, in accordance with embodiments discussed herein. For example, system 100 may facilitate generation of unique synthetic time series datasets having irregularities, such as anomalies or change points. System 100 may, for example, generate synthetic datasets to be used for training or benchmarking machine learning models such as machine learning model 202, as shown in FIG. 2.

Some embodiments involve generating synthetic datasets from various components. System 102 (e.g., communication subsystem 112) may receive a command to generate a synthetic dataset, such as a time series dataset. System 102 (e.g., data generation subsystem 116) may generate, for the synthetic time series dataset, multiple components from which to build the data. For example, the components may include seasonality, trend, noise, or other components. Data generation subsystem 116 may generate the seasonality component by generating a first set of data points using a first harmonic function from a set of available harmonic functions. Data generation subsystem 116 may generate the trend component by generating a second set of data points for the synthetic time series dataset using a first trend function from a set of available trend functions. Data generation subsystem 116 may generate noise by generating a third set of data points using a first noise function of a set of noise-generating functions. In some embodiments, system 102 (e.g., data modification subsystem 118) may scale one or more of the components to ensure that one component does not drown out another in the final synthetic dataset. For example, data modification subsystem 118 may scale one or more of the sets of data points to satisfy a ratio between components. The ratio may be predetermined or may be received with the command. By scaling the components, the system may ensure that each component contributes to the final synthetic dataset without drowning out the other components.

In particular, communication subsystem 112 may receive a user input. The user input may include a command to generate a synthetic dataset. A synthetic dataset may be a collection of data that was not directly sourced from real-world events but rather was artificially generated. Synthetic data may mirror the characteristics and structures of authentic data while not embodying any of the original information. In some embodiments, synthetic data may increase the amount of unique datasets available for training, testing, and benchmarking models. In some embodiments, the command may instruct data generation subsystem 116 to generate a particular type of dataset, such as a synthetic time series dataset. A time series dataset may be a collection of observations recorded sequentially over time. A synthetic time series dataset may include a plurality of data points for a plurality of equal time periods. Each data point in the series may be associated with a specific time slot, and the data is typically measured at consistent intervals. Time series datasets have a temporal order, and thus, the sequence in which the data is recorded is crucial. In some embodiments, the time variable of a time series dataset may be represented as $t=[1, 2, \ldots, T]$ or as a list of increasing integers. These integers may be converted to dates or time slots after the time series is generated. As an illustrative example, data generation subsystem 116 may generate a synthetic time series dataset that represents a number of applicants applying for admission to a program each day.

In some embodiments, data generation subsystem 116 may generate synthetic time series datasets using various components as building blocks. For example, the components may include a seasonality component, a trend component, a noise component, or other components. A seasonality component may include recurring fluctuations or patterns that occur periodically and are predictable. Seasonality may be attributed to specific causes, like seasons or holidays. In some embodiments, seasonal effects may arise due to the calendar (e.g., holiday slowdowns), weather patterns (e.g., decreased production in the summer), or other regularly occurring events. Seasonality can affect prediction accuracy if the period of seasonality is not accounted for by system 102. Seasonality may include a period and an amplitude. The period, also known as the cycle or frequency, may represent the length of time it takes for a full cycle of the seasonal pattern to complete before it starts repeating itself. For example, in yearly data, if there is a pattern that repeats every twelve months (e.g., increased activity every October), the period may be twelve months. Amplitude may refer to the magnitude or strength of the seasonal pattern. Specifically, amplitude may be the difference between the peak (maximum value) and the mean or, equivalently, the difference between the trough (minimum value) and the mean of the seasonal pattern. Amplitude may provide an indication of how significant the seasonal effect is. A higher amplitude may mean that the seasonal effect is more pronounced or more influential in the dataset. For example, if a program sees its application numbers go from an average of zero applications between admissions cycles to 20,000 applications at the peak of admissions season, the amplitude of the yearly seasonality may be 20,000. As an illustrative example, applications for admission may follow a pattern of low numbers during an early admissions cycle, high numbers over the course of a regular admissions cycle, and zero applications between admissions cycles.

In some embodiments, data may include irregular cyclic patterns that are not seasonal. For example, irregular cyclic patterns may be fluctuations that occur over irregular intervals. Unlike seasonality, they may not have a fixed period. As an example, economic cycles may be related to periods of booms and recessions. These cycles may be driven by a combination of factors and may not be tied to a calendar schedule. As an illustrative example, programs may receive higher numbers of applications during economic recessions than during normal economic times.

In some embodiments, seasonality may be combined with trend in various ways, such as by adding seasonality to trend or by multiplying seasonality by trend. As such, seasonality may be additive or multiplicative. As an illustrative example, additive seasonality may be present when a program increases in popularity every year, increasing the total number of applicants by 1,000 each year (e.g., the trend component), and more people apply during the winter because they are planning for the next academic year (e.g., the seasonality component). This seasonal factor adds an extra 5,000 applicants every winter, regardless of the year. In this case, the seasonality is additive because the seasonal effect (additional applicants) remains constant across years, while the trend (growing popularity) continuously adds more applicants. The seasonality is thus added to the trend. As an illustrative example, multiplicative seasonality may be present when the program gains popularity over time and the seasonal effect is a percentage increase instead of a constant number. For example, there may be a 50% increase in applicants every winter due to the seasonal factor. The seasonal effect may thus become amplified with the trend. As the base number of applicants increases, the seasonal difference also increases because the seasonality is a percentage of the growing total. The seasonality is thus multiplied by the trend.

In some embodiments, the seasonality component may be represented by seasonality(t). In some embodiments, seasonality may be represented by an equation such as seasonality (t)=amplitude*sin(2*pi*t/period). In some embodiments, seasonality may be represented by an equation such as seasonality(t)=amplitude*cos($2*\pi*t$/period). In some embodiments, seasonality may be represented by another harmonic function or by a combination of harmonic functions. In some embodiments, data generation subsystem 116 may determine the seasonality function based on available harmonic functions, which may be stored or received as user input. In some embodiments, seasonality may be represented by seasonality(t)=amplitude*sin ($2*\pi*t$/period)+c, where c=0 for additive seasonality and c=1 for multiplicative seasonality. For example, c=1 for multiplicative seasonality because seasonality may oscillate around 1 for multiplicative effects. In some embodiments, the amplitude of the seasonality may be defined relative to a mean of the trend. For example, the amplitude may be defined as part of a ratio relative to the mean of the trend. Data modification subsystem 118 may scale one or both of the seasonality or trend components to fit the ratio. This may ensure that the seasonality component does not drown out the trend component and vice versa. In some embodiments, the ratio may be predetermined or may be received as user input. A ratio of mean seasonality to mean trend may, for example, be 3/5. The ratio may measure the effect of seasonality consistently between additive and multiplicative seasonality. In some embodiments, the amplitude for additive seasonality may be amplitude=ratio*mean_trend, where mean_trend is the mean of the trend component. For multiplicative seasonality, the amplitude may be amplitude=ratio. In some embodiments, values for the seasonality type (e.g., additive versus multiplicative), the period, and the ratio may be randomly assigned or may be overridden with specific values defined by a user input.

The trend component may represent a long-term movement in data over time. A trend may include a persistent, consistent tendency for the data to increase (upward trend) or decrease (downward trend) during a longer period. As an illustrative example, an increase in popularity of a program may lead to a trend of steadily increasing numbers of applicants applying to the program over years. Recognizing trends may be crucial for accurate predictions by machine learning models. For example, if a trend is present and not accounted for, predictions may consistently undershoot or overshoot actual values. As such, it is important for synthetic datasets to include trends to train models to recognize trends or to benchmark models. In some embodiments, the trend component may be represented by trend(t). In some embodiments, the trend may be downward, upward, or stationary (e.g., horizontal). In some embodiments, the trend may be linear and may be represented by trend(t)=intercept+slope*t. In some embodiments, the trend may be exponential, polynomial, logarithmic, or another type of trend and may be represented by different equations, respectively. In some embodiments, data generation subsystem 116 may determine the trend function based on available trend functions, which may be stored or received as user input. In some embodiments, the type of trend function and values for intercept and slope may be randomly assigned or may be overridden with specific values defined by a user input.

A noise component may include random variations, such as unpredictable, erratic, and irregular movements in the time series that cannot be attributed to any of the aforementioned components. Noise may arise from random variations, measurement errors, or other unaccounted-for influences. While noise cannot be predicted, understanding its characteristics (e.g., mean and variance) is essential for building accurate models. The mean of the noise component represents the average value of the noise. In some embodiments, the mean of the noise may be equal or close to zero, indicating that the noise is evenly distributed around zero without any bias. In some embodiments, a noise component having a non-zero mean may contribute to the trend component. The variance of the noise component may quantify the spread or dispersion of the random fluctuations around the mean. If the noise has high variance, the random fluctuations may be large and can span a wide range of values. Conversely, if the variance is small, the fluctuations may be relatively uniform and close to the mean. As an illustrative example, noise in applications to a program may include fluctuations in application numbers that are not attributable to seasonality, trend, or other components. A brief server outage on the application portal may lead to a minor drop in applications for a short time period. A popular figure mentioning the program publicly may cause temporary, unpredictable surges.

In some embodiments, the noise component may be represented by noise(t). The noise may be Gaussian, auto-regressive, or another type of noise. In some embodiments, data generation subsystem 116 may determine the noise function based on available noise-generating functions, which may be stored or received as user input. For example, Gaussian noise may be a basic type of statistical noise having a probability density function equivalent to that of the normal distribution, which is also known as the Gaussian distribution. Gaussian noise may be independent and identically distributed, have a mean of zero, have a certain standard deviation, and be uncorrelated from one data point to another. Gaussian noise may be represented as basic_noise(t)=Gaussian (mean, variance(t)). In some embodiments, noise(t) may have constant variance (e.g., homoscedasticity). For constant variance, variance(t)= mean_variance, wherein mean_variance is the mean of the variance. Alternatively, noise(t) may have non-constant variance (e.g., heteroscedasticity), such as a linearly increasing variance. A function describing a non-constant variance may have an average of mean_variance. In some embodiments, auto-regressive noise may be a type of noise that is modeled by a linear model where the value of a series at a particular time point is a linear function of its previous values. For example, auto-regressive noise may be represented by noise (t)=a*noise(t−1)+b*noise(t−2)+basic_noise(t), where "a" and "b" are the auto-regressive coefficients. The user input may specify an order of auto-regressive behavior, such as zero order (e.g., no auto-regressive behavior), first order (e.g., noise(t)=a*noise(t−1)+basic_noise(t)), second order (e.g., noise(t)=a*noise(t−1)+b*noise(t−2)+basic_noise(t)), etc., or data generation subsystem 116 may randomly determine the order of auto-regressive behavior. In some embodiments, the user input may specify the auto-regressive coefficients, or data generation subsystem 116 may randomly generate the coefficients uniformly with bounds that ensure that the resulting auto-regressive function is stationary.

In some embodiments, the variance of the noise may be defined relative to a mean of the trend. For example, the variance may be defined as part of a ratio relative to the mean of the trend. Data modification subsystem 118 may scale one or both of the variance of the noise or trend components to fit the ratio. This may ensure that the noise component does not drown out the trend component and vice versa. In some embodiments, the ratio may be predetermined or may be received as user input. The ratio of mean variance to mean trend may, for example, be 1/5. In some embodiments, the variance of the noise may be defined as mean_variance=ratio*mean_trend, where mean_variance is the mean of the variance of the noise and mean_trend is the mean of the trend component. In some embodiments, values for the noise type (e.g., Gaussian, auto-regressive, or another type), the auto-regressive order, and the ratio may be randomly assigned or may be overridden with specific values defined by a user input.

As previously discussed, communication subsystem 112 may receive a user input. In some embodiments, the user input may include a command to generate a synthetic time series dataset. The user input may instruct system 102 to generate the synthetic time series dataset using the components discussed above or using other methods. In some embodiments, the user input may include parameters for generating the synthetic time series dataset. For example, the parameters may include a time interval (e.g., minutes, days, years, etc.), a number of time slots (e.g., 365 time slots), or other parameters of the synthetic time series dataset. The parameters may include one or more of a seasonality type, period, or ratio; a trend function, slope, or intercept; or a noise type, order, or ratio. In some embodiments, the parameters may include details relating to irregularities. For example, the parameters may include a percentage or number of desired anomalies of the synthetic dataset. In some embodiments, the parameters may include a minimum distribution for anomalies (e.g., a minimum number of data points between anomalies). In some embodiments, the parameters may include a percentage or number of desired change points of the synthetic dataset. In some embodiments, the parameters may include a minimum distribution for change points (e.g., a minimum number of data points between change points). In some embodiments, the user input may involve other parameters for the synthetic time series dataset.

In response to receiving the command to generate the synthetic time series dataset, data generation subsystem 116 may generate the data points for the seasonality component, the trend component, and the noise component. For example, generating data points for each component may involve generating a value for each time slot (e.g., t=[1, 2, . . . , T]) for each component. Data generation subsystem 116 may generate a first set of data points using a first harmonic function from a set of available harmonic functions. The first set of data points may be defined by, for example, seasonality(t)=amplitude*sin(2*π*t/period)+c and amplitude=ratio*mean_trend, where t=[1, 2, . . . , T] and where seasonality type, period, and ratio are randomly generated or specified by the user input. Data generation subsystem 116 may generate a second set of data points using a first trend function from a set of available trend functions. The second set of data points may be defined by, for example, trend(t)=intercept+slope*t, where t=[1, 2, . . . , T] and where trend function, slope, and intercept are randomly generated or specified by the user input. Data generation subsystem 116 may generate a third set of data points using a first noise function from a set of available noise-generating functions. The third set of data points may be, for example, defined by noise(t)=Gaussian(mean, variance(t)) and mean_variance=ratio*mean_trend, where t=[1, 2, . . . , T] and where noise type, order, and ratio are randomly generated or specified by the user input. In some embodiments, data generation subsystem 116 may use other equations or other combinations of equations to generate the sets of data points for the various components.

In some embodiments, generating a synthetic time series dataset may involve combining the various components discussed above. In some embodiments, data aggregation subsystem 120 may combine the seasonality component, the trend component, the noise component, and any other components. In some embodiments, one or more of these components may be modified or replaced before the components are aggregated. Data aggregation subsystem 120 may generate, for consecutive time slots of the synthetic time series dataset, data points for the synthetic time series, where the data points are generated by combining the seasonality component, the trend component, the noise component, and any other components. In some embodiments, data aggregation subsystem 120 may combine the components by adding the seasonality component, the trend component, and the noise component (e.g., for additive seasonality). In some embodiments, data aggregation subsystem 120 may combine the components by adding the product of the seasonality component and the trend component to the noise component (e.g., for multiplicative seasonality). In some embodiments, the noise component may include one or more anomalies. Combining the various components may thus generate a synthetic time series dataset having one or more anomalies.

In some embodiments, combining the components may involve combining corresponding data points from each of the datasets for seasonality, trend, and noise. In some embodiments, data aggregation subsystem 120 may combine the same datasets for the entire time series dataset. For example, data aggregation subsystem 120 may combine a first seasonality set of data points, a first trend set of data points, and a first noise set of data points to generate the synthetic time series dataset. In some embodiments, data aggregation subsystem 120 may combine different combinations of datasets for different portions of the time series dataset. For example, to generate the synthetic time series dataset, data aggregation subsystem 120 may combine a first seasonality set of data points, a first trend set of data points, and a first noise set of data points for a first portion of consecutive time slots of the synthetic time series dataset and data aggregation subsystem 120 may combine the first seasonality set of data points, a second trend set of data points, and the first noise set of data points for a different portion of consecutive time slots of the synthetic time series dataset. Data aggregation subsystem 120 may thus generate a change point based on the trend component. In some embodiments, data aggregation subsystem 120 may combine the first seasonality set of data points, the first trend set of data points, and the first noise set of data points for a first portion of consecutive time slots of the synthetic time series dataset and data aggregation subsystem 120 may combine a second seasonality set of data points, the first trend set of data points, and the first noise set of data points for a different portion of consecutive time slots of the synthetic time series dataset. Data aggregation subsystem 120 may thus generate a change point based on the seasonality component.

In some embodiments, data aggregation subsystem 120 may include one or more labels with the synthetic time series dataset. For example, the labels may identify the components described above or other features of the synthetic time series dataset. In some embodiments, a label may be a feature vector that describes the characteristics of the synthetic time series dataset. Models may rely upon the labels as feedback on performance during training, testing, or benchmarking. As an example, a label may be {"trend": "upward", "seasonality": "yearly", "noise": "Gaussian"}. In some embodiments, labels may be more specific, such as {"trend_direction": "upward", "trend_slope": 2, "seasonality_type": "multiplicative", "seasonality_period": "monthly", "peak_month": "December" "noise_distribution": "Gaussian" 3 "noise_standard_deviation": 5.3}. In some embodiments, other types of labels may be used. In some embodiments, labels may identify types and locations of irregularities in the synthetic time series dataset, as will be discussed below.

Generation of Synthetic Datasets Having Anomalies

In some embodiments, system 100 may facilitate generation of synthetic datasets having anomalies.

As previously discussed, some embodiments involve generating synthetic datasets from various components. Communication subsystem 112 may receive a command to generate a synthetic dataset, such as a time series dataset. Data generation subsystem 116 may generate, for the synthetic time series dataset, multiple components from which to build the data. For example, the components may include seasonality, trend, noise, or other components. Data generation subsystem 116 may generate the seasonality component by generating a first set of data points using a first harmonic function from a set of available harmonic functions. Data generation subsystem 116 may generate the trend component by generating a second set of data points for the synthetic time series dataset using a first trend function from a set of available trend functions. Data generation subsystem 116 may generate noise by generating a third set of data points using a first noise function of a set of noise-generating functions. In some embodiments, data modification subsystem 118 may scale one or more of the components to ensure that one component does not drown out another in the final synthetic dataset.

Some embodiments involve generating anomalies in the synthetic time series dataset. Data modification subsystem 118 may modify the third set of data points (e.g., the noise component) to generate an anomaly in the synthetic time series dataset. An anomaly may be a data point that deviates significantly from other data points. The anomaly may indicate something unusual, unexpected, or not conforming to a normal pattern. As an illustrative example, an anomaly may be a day on which application numbers for a program plummet during peak application season. An anomaly such as this may be caused, for example, by negative news coverage that causes many applicants to refrain from applying for a period of time or by another unusual circumstance. To generate anomalies within a synthetic time series dataset, data modification subsystem 118 may modify the noise component, which accounts for unpredictable, erratic, and irregular movements in the time series. Data generation subsystem 116 may first determine an amount of variance of the third set of data points. The variance may be a difference between a highest data point and a lowest data point within the noise component. Data generation subsystem 116 may then determine, based on user input received with the command to generate the synthetic dataset, a minimum anomaly variance and a maximum anomaly variance. The minimum anomaly variance may define a minimum change of anomalies relative to the variance of the noise component and the maximum anomaly variance may define a maximum change of the anomalies relative to the variance of the noise component. For example, the minimum anomaly variance and maximum anomaly variance may define a range of variance within which to generate the anomalies. Data modification subsystem 118 may generate one or more anomalies by replacing the values of one or more data points in the noise component with one or more values within the range of variance for anomalies (e.g., between the minimum anomaly variance and maximum anomaly variance). System 102 (e.g., data aggregation subsystem 120) may then generate a synthetic time series dataset by combining the first set of data points, the second set of data points, and the third set of data points into corresponding time slots of the synthetic time series dataset.

Figure 3A:
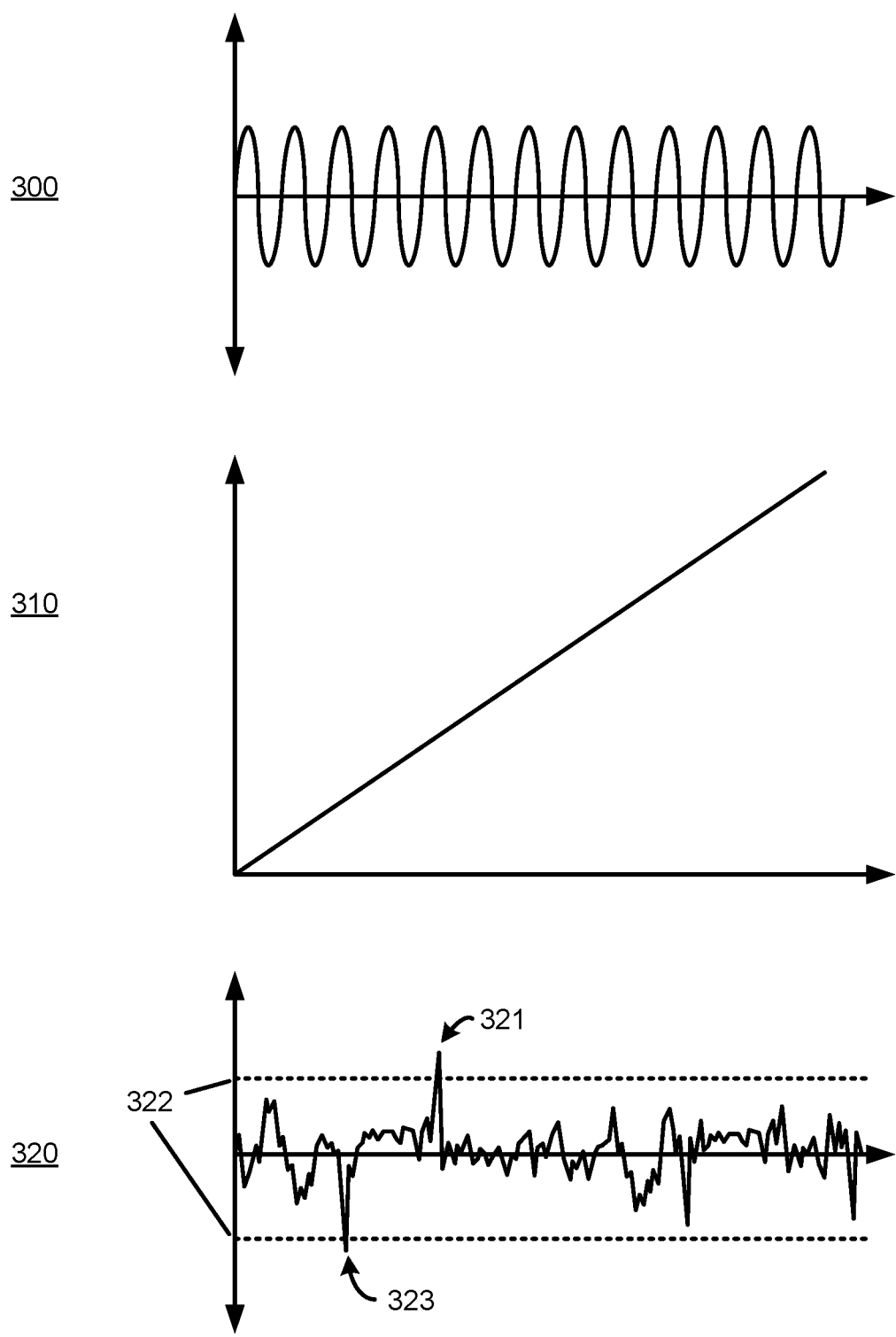
FIGS. 3A, 3B, and 3C illustrate generation of a synthetic time series dataset having anomalies, in accordance with one or more embodiments.

FIG. 3A illustrates generation of a synthetic time series dataset having anomalies, in accordance with one or more embodiments. For example, FIG. 3A includes a seasonality component 300, a trend component 310, and a noise component 320. In some embodiments, seasonality component 300, trend component 310, and noise component 320 may be graphs representing functions associated with seasonality, trend, and noise, respectively. In some embodiments, seasonality component 300, trend component 310, and noise component 320 may be subsets of larger graphs. As illustrated in FIG. 3A, the seasonality component may be a harmonic function (e.g., sin, cos, etc.), the trend component may be an upward linear function, and the noise component may be Gaussian. Data generation subsystem 116 may generate three sets of data points using the harmonic function of the seasonality component, the linear function of the trend component, and the Gaussian function of the noise component. In some embodiments, these sets of data points may be modified and then combined to generate the synthetic time series dataset.

In some embodiments, data modification subsystem 118 may scale a variance of the third plurality of data points (e.g., noise component 320) such that a relationship between the second plurality of data points (e.g., trend component 310) and the third plurality of data points (e.g., noise component 320) satisfies a ratio. Data modification subsystem 118 may scale one or both of the variance of the noise or trend components to fit the ratio. In some embodiments, the ratio balances the relationship between the noise and the trend such that neither component overpowers the other. This may ensure that the noise component does not drown out the trend component and vice versa. In some embodiments, the ratio may be predetermined or may be received as user input. The ratio of mean variance to mean trend may, for example, be 1/5. In some embodiments, the variance of the noise may be defined as mean_variance=ratio*mean_trend, where mean_variance is the mean of the variance of the noise and mean_trend is the mean of the trend component. The ratio may be predetermined, random, retrieved from the user input, or determined in another manner.

In some embodiments, data modification subsystem 118 may determine a point variance of the third plurality of data points (e.g., noise component 320). In some embodiments, the point variance is a measure of variance of the third plurality of data points. For example, the point variance may be a mean variance of the noise component. To calculate the mean variance, data modification subsystem 118 may determine the mean of all data points within the third plurality of data points. As previously discussed, the mean of the noise component may be zero so that it does not contribute to the trend component over time. Data modification subsystem 118 may then subtract the mean from the value of each data point and square the result. For noise components having a mean of zero, this step will merely involve squaring the value of each data point in the noise component. Data modification subsystem 118 may then calculate the average of the squared values. The resulting average may be the mean variance of the noise component. In some embodiments, this average may be referred to as the point variance. In some embodiments, the point variance may be a difference between a highest data point and a lowest data point within the noise component. In some embodiments, the point variance may be another measure of variance of the noise component.

In some embodiments, data modification subsystem 118 may determine a range of variance for the anomalies. In some embodiments, data modification subsystem 118 may determine the range of variance for the anomalies based on user input, which may include a plurality of parameters. In some embodiments, the plurality of parameters may include an update parameter for updating data points to generate anomalies. In some embodiments, the update parameter may specify a minimum and a maximum anomaly variance for the anomalies. In some embodiments, the minimum anomaly variance may define a minimum change of anomalies relative to the point variance and the maximum anomaly variance may define a maximum change of the anomalies relative to the point variance. As an example, the minimum and maximum anomaly variance may be defined in terms of standard deviations of the point variance (e.g., mean variance). A standard deviation may be a measure of variability indicating how spread out values of the third plurality of data points are around their mean. The minimum anomaly variance may be a first number of standard deviations of the point variance of the third plurality of data points, and the maximum anomaly variance may be a second number of standard deviations of the point variance of the third plurality of data points. In some embodiments, the second number of standard deviations may be greater than the first number of standard deviations. For example, the minimum anomaly variance may be defined as two standard deviations of the point variance. The maximum anomaly variance may be defined as ten standard deviations of the point variance. In some embodiments, minimum and maximum anomaly variance may be defined in other terms.

In some embodiments, the minimum anomaly variance may be greater than all or most of the data points within the noise component. However, data modification subsystem 118 may determine that one or more data points of the noise component have values that exceed the minimum anomaly variance. For example, as illustrated in FIG. 3A, data point 321 and data point 323 may have values that exceed the minimum anomaly variance (e.g., minimum anomaly variance 322). Based on determining that data point 321 and data point 323 each have values that exceed minimum anomaly variance 322, data modification subsystem 118 may replace (e.g., override) the values of each of data point 321 and data point 323 with a new value that is equal to minimum anomaly variance 322. Data modification subsystem 118 may thus remove any data points within the noise component that may inherently qualify as anomalies based on the minimum anomaly variance and maximum anomaly variance for a given synthetic time series dataset. In some embodiments, data modification subsystem 118 may retain the positive or negative sign from the original value associated with each of data point 321 and data point 323. For example, data modification subsystem 118 may replace the original value of data point 321 with the positive value associated with minimum anomaly variance 322. Data modification subsystem 118 may replace the original value of data point 323 with the negative value associated with minimum anomaly variance 322.

Figure 3B:
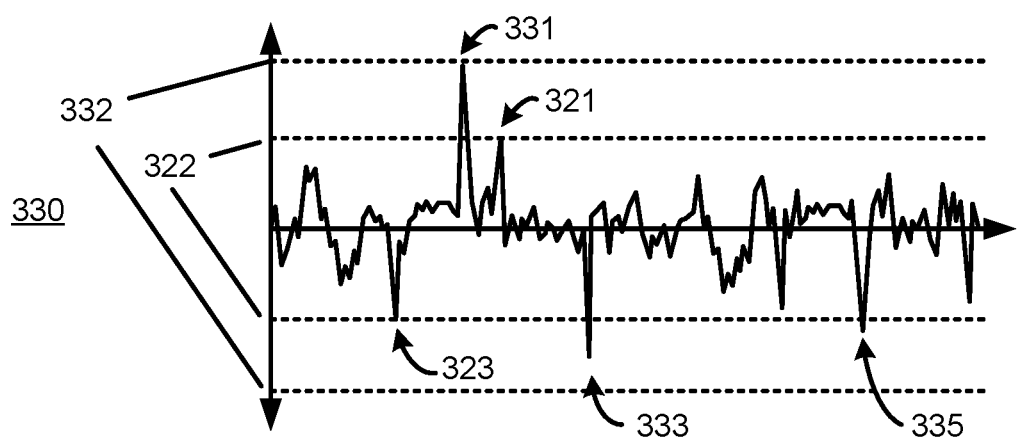

FIG. 3B illustrates generation of a synthetic time series dataset having anomalies, in accordance with one or more embodiments. In particular, FIG. 3B illustrates a modified noise component 330. In some embodiments, modified noise component 330 may be a modified version of noise component 320. In some embodiments, noise component 320 may be a subset of a larger graph. Modified noise component 330 may include updated values for data point 321 and data point 323, where the updated values are equal to the minimum anomaly variance 322. In some embodiments, modified noise component 330 may include maximum anomaly variance 332. The range between minimum anomaly variance 322 and maximum anomaly variance 332 may be a range in which data modification subsystem 118 may generate anomalies in the noise component. In some embodiments, modified noise component 330 may include anomaly 331, anomaly 333, anomaly 335, or other anomalies.

Data modification subsystem 118 may generate one or more anomalies by applying corresponding anomaly variance to one or more data points in the third plurality of data points (e.g., the noise component). In some embodiments, applying the corresponding anomaly variance may involve replacing one or more original values of one or more data points in the noise component with values between the minimum anomaly variance and the maximum anomaly variance (e.g., between minimum anomaly variance 322 and maximum anomaly variance 332). In some embodiments, data modification subsystem 118 may generate the anomalies either above the mean of the noise component (e.g., anomaly 331) or below the mean of the noise component (e.g., anomaly 333 and anomaly 335). In some embodiments, data modification subsystem 118 may randomly determine whether each anomaly is generated above or below the mean. In some embodiments, the user input may include a parameter specifying a certain number, percentage, portion, or other parameter indicating how many anomalies or which anomalies are to be generated above versus below the mean of the noise component.

In some embodiments, data modification subsystem 118 may determine a number of anomalies to generate based on a random number, user input, or other information. In some embodiments, the user input may include a percentage of anomalies and a time period for anomalies to be generated for the synthetic time series dataset. As an example, the user input may specify that the synthetic time series dataset should include 10,000 data points and that 0.1% of the data points should be anomalies. Data modification subsystem 118 may determine, based on the percentage and the time period of the synthetic time series dataset, a number of anomalies to generate within the synthetic time series dataset (e.g., ten anomalies).

In some embodiments, data modification subsystem 118 may determine one or more locations within the synthetic time series dataset for the one or more anomalies. In some embodiments, the one or more locations may be time slots within the third plurality of data points (e.g., the noise component). In some embodiments, data modification subsystem 118 may determine one or more random time slots of the one or more data points of the noise component to update based on the number of anomalies. For example, if data modification subsystem 118 is generating ten anomalies, data modification subsystem 118 may select ten random time slots. In some embodiments, data modification subsystem 118 may determine a minimum distribution for the one or more anomalies. For example, the minimum distribution may be a minimum number of time slots between any two anomalies within the synthetic time series dataset. In some embodiments, data modification subsystem 118 may retrieve the minimum distribution from the user input, or the minimum distribution may be random, with bounds based on the number of anomalies and the number of time slots in the dataset. Data modification subsystem 118 may then determine one or more time slots of the one or more data points to update based on the number of anomalies. For example, data modification subsystem 118 may select the time slots such that the one or more time slots satisfy the minimum distribution for the one or more anomalies relative to each other. As an example, data modification subsystem 118 may select time slots of the one or more anomalies such that no two anomalies are within the minimum distribution of each other. In some embodiments, the user input may include a parameter that specifies specific locations (e.g., time slots) for the one or more anomalies. In some embodiments, data modification subsystem 118 may use another method of determining the locations of the anomalies within the noise component.

In some embodiments, generating the one or more anomalies may involve evenly distributing the values of the anomalous data points between the minimum anomaly variance and the maximum anomaly variance. As shown in FIG. 3B, data modification subsystem 118 may generate three anomalies having values that are evenly distributed between minimum anomaly variance 322 and maximum anomaly variance 332. For example, anomaly 331 may have a value that is close to maximum anomaly variance 332, anomaly 335 may have a value that is close to minimum anomaly variance 322, and anomaly 333 may have a value that is close to the mean of minimum anomaly variance 322 and maximum anomaly variance 332. In some embodiments, data modification subsystem 118 may generate the anomalies with another distribution pattern between the minimum anomaly variance and the maximum anomaly variance. In some embodiments, data modification subsystem 118 may generate anomalies having random values between the minimum anomaly variance and the maximum anomaly variance.

Returning to FIG. 1, data aggregation subsystem 120 may generate the synthetic time series dataset having anomalies based on the components shown in FIGS. 3A and 3B. For example, data aggregation subsystem 120 may combine a first plurality of data points (e.g., seasonality component 300), a second plurality of data points (e.g., trend component 310), and a third plurality of data points (e.g., modified noise component 330) into corresponding time slots of the plurality of time slots. For example, data aggregation subsystem 120 may identify, for each time slot of the plurality of time slots (e.g., t=[1, 2, . . . , T]), (1) a corresponding first data point within the first plurality of data points (e.g., a corresponding first point of seasonality component 300), (2) a corresponding second data point within the second plurality of data points (e.g., a corresponding second data point of trend component 310), and (3) a corresponding third data point within the third plurality of data points (e.g., a corresponding third point of modified noise component 330). For each time slot (e.g., t=1), data aggregation subsystem 120 may aggregate the first corresponding data point, the second corresponding data point, and the third corresponding data point. In some embodiments, aggregating may involve adding magnitudes of the corresponding first data point (e.g., seasonality), the corresponding second data point (e.g., trend), and the corresponding third data point (e.g., noise). For example, for certain types of seasonality (e.g., if seasonality component 300 is additive), data aggregation subsystem 120 may aggregate the components using y(t)=seasonality(t)+trend(t)+noise(t), where y(t) represents the synthetic time series data. In some embodiments, aggregating may involve adding a magnitude of the corresponding third data point (e.g., noise) to a product of the corresponding first data point (e.g., seasonality) and the corresponding second data point (e.g., trend). For example, for certain types of seasonality (e.g., if seasonality component 300 is multiplicative), data aggregation subsystem 120 may aggregate the components using y(t)=seasonality(t)*trend(t)+noise(t). In some embodiments, data aggregation subsystem 120 may aggregate the components into the synthetic time series dataset using other techniques or using a combination of techniques.

Figure 3C:
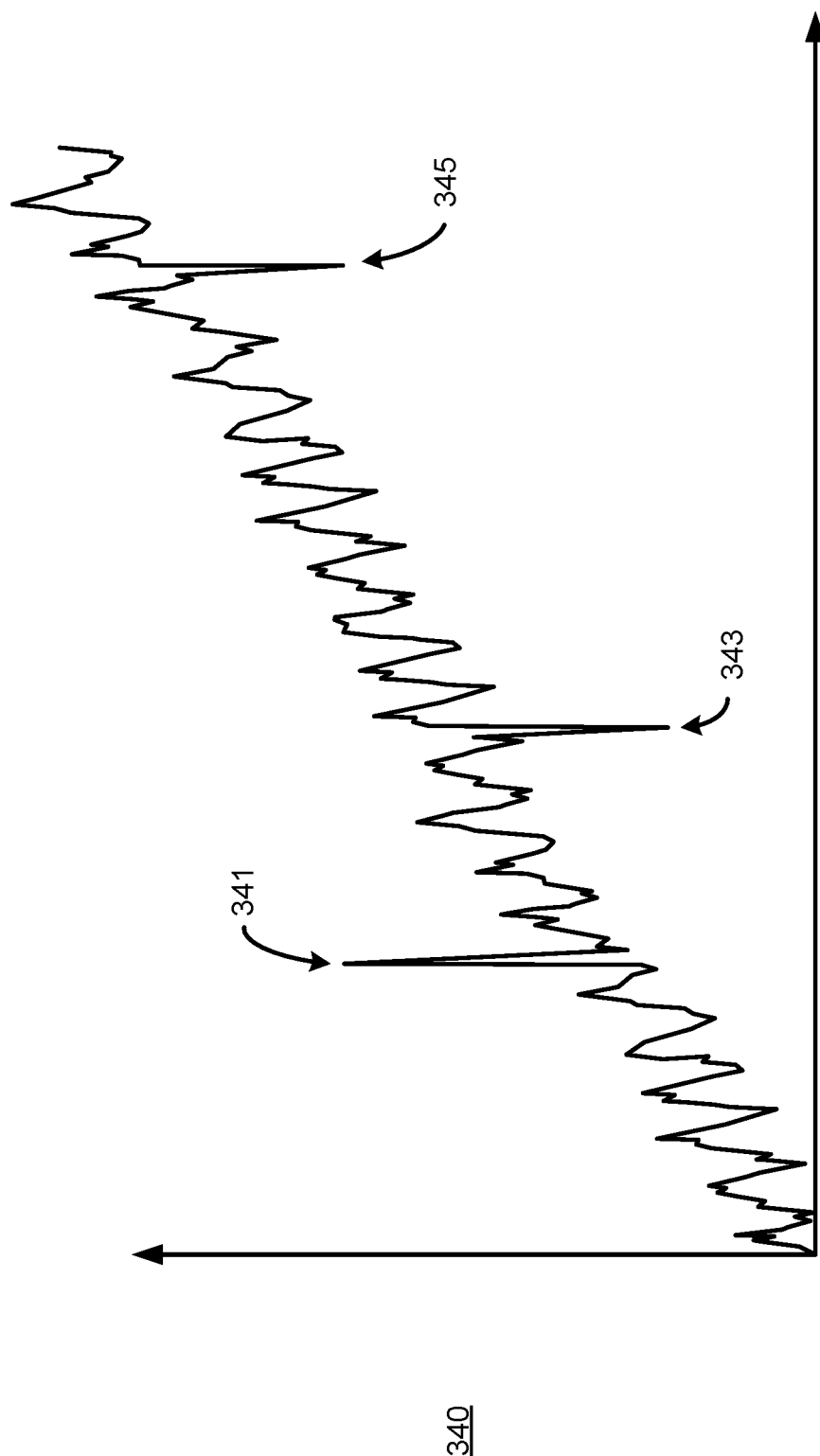

FIG. 3C illustrates generation of a synthetic time series dataset having anomalies, in accordance with one or more embodiments. In particular, FIG. 3C illustrates a synthetic time series dataset 340 having anomalies. In some embodiments, synthetic time series dataset 340 may be a subset of a larger graph. In some embodiments, synthetic time series dataset 340 may represent an aggregation of seasonality component 300, trend component 310, and modified noise component 330. For example, each point in synthetic time series dataset 340 may be a combination (e.g., sum, product, or other combination) of seasonality component 300, trend component 310, and modified noise component 330. As an illustrative example, synthetic time series dataset 340 may represent application numbers for admission to a program over time. For example, synthetic time series dataset 340 may illustrate application numbers over twenty-two years. Synthetic time series dataset 340 may include a seasonality component (e.g., seasonality component 300), which increases during application season and decreases between application cycles. Synthetic time series dataset 340 may include a trend component (e.g., trend component 310), which is an upward trend over time. For example, the program may gain popularity over time, leading to a steady increase in applications over the years. In some embodiments, the seasonality illustrated in synthetic time series dataset 340 may be additive. More people may apply during each winter because they are planning for the next academic year. This seasonal factor may add an extra 5,000 applicants every winter, regardless of the year. In this case, the seasonality is additive because the seasonal effect (additional applicants) remains constant across years, while the trend (growing popularity) continuously adds more applicants. Thus, data aggregation subsystem 120 adds seasonality component 300 and trend component 310 during the aggregation process. Synthetic time series dataset 340 may also include a noise component (e.g., modified noise component 330). For example, noise in applications to a program may include fluctuations in application numbers that are not attributable to seasonality, trend, or other components. A brief server outage on the application portal may lead to a minor drop in applications for a short time period. A popular figure mentioning the program publicly may cause temporary, unpredictable surges.

In some embodiments, synthetic time series dataset 340 may include anomaly 341, anomaly 343, and anomaly 345. In some embodiments, synthetic time series dataset 340 may include additional anomalies. In some embodiments, anomaly 341, anomaly 343, and anomaly 345 may correspond to anomaly 331, anomaly 333, and anomaly 335, as shown in FIG. 3B. As an example, each anomaly represents something unusual, unexpected, or not conforming to a normal pattern. For example, anomaly 343 may be a day on which application numbers for a program plummet during application season. Anomaly 343 may be caused, for example, by negative news coverage that causes many applicants to refrain from applying for a period of time. In some embodiments, anomalies may represent other unusual or unexpected events.

In some embodiments, data aggregation subsystem 120 may include one or more labels with synthetic time series dataset 340. For example, the labels may identify features of synthetic time series dataset 340, such as anomalies or other irregularities. In some embodiments, a label may be a feature vector that describes the irregularities of the synthetic time series dataset. Models may rely upon these labels as feedback on performance during training, testing, or benchmarking. As an example, a label may be {"anomaly_count": 3, "anomaly_positions": [2375, 4065, 7300]}. In some embodiments, labels may also identify the components of synthetic time series dataset 340 and characteristics of those components. In some embodiments, other types of labels may be used.

Generation of Synthetic Datasets Having Change Points

In some embodiments, system 100 may facilitate generation of synthetic datasets having change points.

As previously discussed, some embodiments involve generating synthetic datasets from various components. Communication subsystem 112 may receive a command to generate a synthetic dataset, such as a time series dataset. Data generation subsystem 116 may generate, for the synthetic time series dataset, multiple components from which to build the data. For example, the components may include seasonality, trend, noise, or other components. Data generation subsystem 116 may generate the seasonality component by generating a first set of data points using a first harmonic function from a set of available harmonic functions. Data generation subsystem 116 may generate the trend component by generating a second set of data points for the synthetic time series dataset using a first trend function from a set of available trend functions. Data generation subsystem 116 may generate noise by generating a third set of data points using a first noise function of a set of noise-generating functions. In some embodiments, data modification subsystem 118 may scale one or more of the components to ensure that one component does not drown out another in the final synthetic dataset.

Some embodiments involve generating change points in the synthetic time series dataset. To generate a change point, data modification subsystem 118 may modify the second set of data points (e.g., the trend component). A change point may be a point in a time series dataset at which the properties of the dataset undergo a significant change. This change could relate to trend, seasonality, or some other property of the data. Identifying change points may be crucial for understanding underlying system shifts or structural changes in the data-generating process. As an illustrative example, a change point may be a point at which a program's application numbers change from a general increasing tendency to a general decreasing tendency. A change point such as this may be caused by the program dropping in a prominent ranking from a top ranking to a mediocre ranking. To generate a change point within a synthetic time series dataset, data modification subsystem 118 may modify the trend component, which accounts for long-term movement in the time series over time. For example, data modification subsystem 118 may modify a first trend function to a second trend function of the set of available trend functions. Modifying the first trend function may involve modifying a level or a slope associated with the first trend function. Data modification subsystem 118 may generate a change point for the synthetic time series dataset by replacing, for a subset of consecutive time slots, corresponding data points of the trend component with a corresponding fourth set of data points generated using the second trend function. Data aggregation subsystem 120 may then generate a synthetic time series dataset by combining corresponding data points generated for the seasonality, trend, and noise components. In particular, data aggregation subsystem 120 may combine the seasonality data points, the first trend data points, and the noise data points for corresponding time slots and may combine the seasonality data points, the second trend data points, and the noise data points for the subset of consecutive time slots.

Figure 4A:
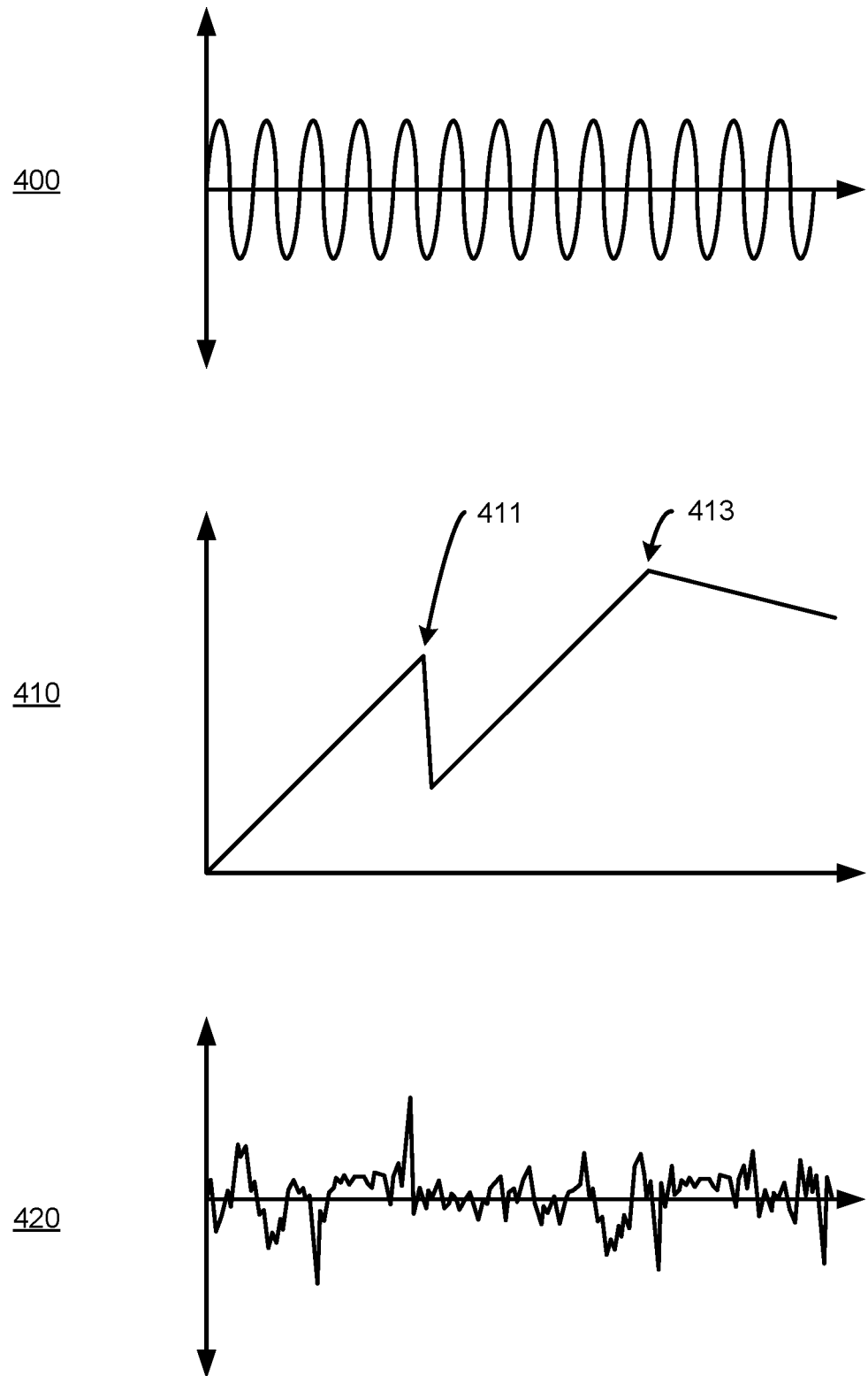
FIGS. 4A and 4B illustrate generation of a synthetic time series dataset having change points, in accordance with one or more embodiments.

FIG. 4A illustrates generation of a synthetic time series dataset having change points, in accordance with one or more embodiments. For example, FIG. 4A includes a seasonality component 400, a trend component 410, and a noise component 420. In some embodiments, noise component 420 may be optional. In some embodiments, seasonality component 400, trend component 410, and noise component 420 may be graphs representing functions associated with seasonality, trend, and noise, respectively. In some embodiments, seasonality component 400, trend component 410, and noise component 420 may be subsets of larger graphs. As illustrated in FIG. 4A, the seasonality component may be a harmonic function (e.g., sin, cos, etc.), the trend component may be a linear function having two change points (e.g., change point 411 and change point 413), and the noise component may be Gaussian. Data generation subsystem 116 may generate multiple sets of data points, for example, using the harmonic function of the seasonality component, the three linear functions of the trend component, and the Gaussian function of the noise component. In some embodiments, these sets of data points may be modified and then combined to generate the synthetic time series dataset.

In some embodiments, data modification subsystem 118 may scale an amplitude of the first plurality of data points (e.g., seasonality component 400) such that a relationship between the first plurality of data points (e.g., seasonality component 400) and the second plurality of data points (e.g., trend component 410) satisfies a ratio. Data modification subsystem 118 may scale one or both of the seasonality or trend components to fit the ratio. In some embodiments, the ratio balances the relationship between the seasonality and the trend such that neither component overpowers the other. This may ensure that the seasonality component does not drown out the trend component and vice versa. In some embodiments, the ratio may be predetermined or may be received as user input. A ratio of mean seasonality to mean trend may, for example, be 3/5. The ratio may measure the effect of seasonality consistently between additive and multiplicative seasonality. In some embodiments, the amplitude for additive seasonality may be amplitude=ratio*mean_trend, where mean_trend is the mean of the trend component. For multiplicative seasonality, the amplitude may be amplitude=ratio. In some embodiments, values for the seasonality type (e.g., additive versus multiplicative), the period, and the ratio may be randomly assigned or may be overridden with specific values defined by a user input.

As previously discussed, data generation subsystem 116 may generate first, second, and third sets of data points corresponding to a first seasonality function, a first trend function, and a first noise function, respectively. In some embodiments, data modification subsystem 118 may modify the first trend function to a second trend function of a plurality of available trend functions. For example, modifying the first trend function may involve modifying a level or a slope associated with the first trend function. In some embodiments, data modification subsystem 118 may modify the first seasonality function to a second seasonality function of a plurality of available harmonic functions. For example, modifying the second function may involve modifying a period or an amplitude associated with the second function. In some embodiments, data generation subsystem 116 may define the trend component for each individual segment (e.g., the space between two change points). For example, instead of or in addition to modifying the first trend function to generate the second trend function, data generation subsystem 116 may use the first trend function to generate data points for the trend component between t=0 and a time slot associated with change point 411. Data generation subsystem 116 may then use the second trend function to generate data points for the trend component between the time slot associated with change point 411 and a time slot associated with change point 413. Data generation subsystem 116 may then use a third trend function from a plurality of available trend functions to generate data points for the trend component after the time slot associated with change point 413, and so on.

Returning to FIG. 4A, trend component 410 may include two change points (e.g., change point 411 and change point 413). For example, data modification subsystem 118 may modify a first trend function (e.g., prior to change point 411) to a second trend function (e.g., between change point 411 and change point 413). This modification may involve modifying a level associated with the first trend function. For example, if the first trend function is represented by trend(t)=t, the second trend function may be represented by trend(t)=t−b, where b is an integer representing a change in level of the trend function. With a change in level, the slope of the second trend function may be the same as the slope of the first trend function. As an illustrative example, a change in level may be caused by the program dropping in a prominent ranking from a top ranking to a mediocre ranking. The program may retain its gradual increase in popularity over time, but the drop in rankings may nonetheless cause change point 411. Data modification subsystem 118 may then modify the second trend function to a third trend function (e.g., at change point 413). This modification may involve modifying a slope associated with the second trend function. For example, if the second trend function is represented by trend(t)=t−b, the second trend function may be represented by trend(t)=−0.5t−b. As an illustrative example, a change in slope may be caused by an international decrease in demand for a degree associated with the program. The decrease in demand may cause a perceived value of the program to decrease. The program may, from change point 413 onward, gradually decrease in popularity due to the decrease in demand. Data generation subsystem 116 may then generate a fourth set of data points corresponding to the second trend function.

In some embodiments, data modification subsystem 118 may determine a number of change points to generate based on a random number, user input, or other information. In some embodiments, the user input may include a percentage of change points and a time period for change points to be generated for the synthetic time series dataset. As an example, the user input may specify that the synthetic time series dataset should include 10,000 data points and that 0.0002% of the data points should be change points. Data modification subsystem 118 may determine, based on the percentage and the time period of the synthetic time series dataset, a number of change points to generate within the synthetic time series dataset (e.g., two change points).

In some embodiments, data modification subsystem 118 may determine one or more locations within the synthetic time series dataset for the change points. In some embodiments, the one or more locations may be time slots within the second plurality of data points (e.g., trend component 410) or the first plurality of data points (e.g., seasonality component 400). In some embodiments, data modification subsystem 118 may determine one or more random time slots of the one or more data points of the trend component or the seasonality component to update based on the number of change points. For example, if data modification subsystem 118 is generating two change points, data modification subsystem 118 may select two random time slots. In some embodiments, data modification subsystem 118 may determine a minimum distribution for the change points. For example, the minimum distribution may be a minimum number of time slots between any two change points within the synthetic time series dataset. In some embodiments, data modification subsystem 118 may retrieve the minimum distribution from the user input, or the minimum distribution may be random, with bounds based on the number of change points and the number of time slots in the dataset. Data modification subsystem 118 may then determine one or more time slots of the one or more data points to update based on the number of change points. For example, data modification subsystem 118 may select the time slots such that the one or more time slots satisfy the minimum distribution for the one or more change points relative to each other. As an example, data modification subsystem 118 may select time slots of the one or more change points such that no two change points are within the minimum distribution of each other. In some embodiments, the user input may include a parameter that specifies specific locations (e.g., time slots) for the one or more change points. In some embodiments, data modification subsystem 118 may use another method of determining the locations of the change points within the trend component or the seasonality component.

As previously discussed, data generation subsystem 116 may generate, for consecutive time slots of the synthetic time series dataset, (1) a first plurality of data points using a first harmonic function from a plurality of available harmonic functions, (2) a second plurality of data points using a first trend function from a plurality of available trend functions, (3) a third plurality of data points for the synthetic time series dataset using a first noise function of a plurality of noise-generating functions, and (4) a fourth plurality of data points using a second trend function from the plurality of available trend functions. Data modification subsystem 118 may generate a change point for a synthetic time series dataset by replacing, for a subset of the consecutive time slots of the synthetic time series dataset, corresponding data points of the second plurality of data points with corresponding data points of the fourth plurality of data points generated using the second trend function. For example, data modification subsystem 118 may replace data points generated using the first trend function with data points generated using the second trend function between change point 411 and change point 413. In some embodiments, data modification subsystem 118 may repeat this process for change point 413.

Returning to FIG. 1, data aggregation subsystem 120 may generate the synthetic time series dataset having change points based on the components shown in FIG. 4A. For example, for a first change point (e.g., change point 411), data aggregation subsystem 120 may combine (i) the first plurality of data points and the second plurality of data points for corresponding time slots of the plurality of consecutive time slots (e.g., until change point 411) and (ii) the first plurality of data points and the corresponding fourth plurality of data points for the subset of the plurality of consecutive time slots (e.g., between change point 411 and change point 413). For example, data aggregation subsystem 120 may combine data points generated by the seasonality function and the first trend function for time slots before change point 411 and data aggregation subsystem 120 may combine data points generated by the seasonality function and the second trend function for time slots between change point 411 and change point 413. In some embodiments, data aggregation subsystem 120 may repeat the process to generate change point 413. In some embodiments, for the first change point (e.g., change point 411), data aggregation subsystem 120 may combine (i) the first plurality of data points, the second plurality of data points, and the third plurality of data points for corresponding time slots of the plurality of consecutive time slots and (ii) the first plurality of data points, the third plurality of data points, and the fourth plurality of data points for the subset of the plurality of consecutive time slots. For example, data aggregation subsystem 120 may combine data points generated by the seasonality function, the first trend function, and the noise function for time slots before change point 411 and data aggregation subsystem 120 may combine data points generated by the seasonality function, the second trend function, and the noise function for time slots between change point 411 and change point 413. In some embodiments, data aggregation subsystem 120 may repeat the process to generate change point 413.

For example, to combine the pluralities of data points for the various components, data aggregation subsystem 120 may identify, for each time slot of the plurality of time slots (e.g., t=[1, 2, . . . , T]), (1) a corresponding first data point within the first plurality of data points (e.g., a corresponding first point of seasonality component 400), (2) a corresponding second data point within the second plurality of data points or the fourth plurality of data points (e.g., a corresponding second data point of trend component 410), and (3) a corresponding third data point within the third plurality of data points (e.g., a corresponding third point of noise component 420). For each time slot (e.g., t=1), data aggregation subsystem 120 may aggregate the first corresponding data point, the second corresponding data point, and the third corresponding data point. In some embodiments, aggregating may involve adding magnitudes of the corresponding first data point (e.g., seasonality), the corresponding second data point (e.g., trend), and the corresponding third data point (e.g., noise). For example, for certain types of seasonality (e.g., if seasonality component 400 is additive), data aggregation subsystem 120 may aggregate the components by adding magnitudes of the corresponding first data point (e.g., seasonality), the corresponding second data point (e.g., trend), and the corresponding third data point (e.g., noise). In some embodiments, aggregating may involve adding a magnitude of the corresponding third data point (e.g., noise) to a product of the corresponding first data point (e.g., seasonality) and the corresponding second data point (e.g., trend). For example, for certain types of seasonality (e.g., if seasonality component 400 is multiplicative), data aggregation subsystem 120 may aggregate the components by adding a magnitude of the corresponding third data point (e.g., noise) to a product of the corresponding first data point (e.g., seasonality) and the corresponding second data point (e.g., trend). In some embodiments, data aggregation subsystem 120 may aggregate the components into the synthetic time series dataset using other techniques or using a combination of techniques.

Figure 4B:
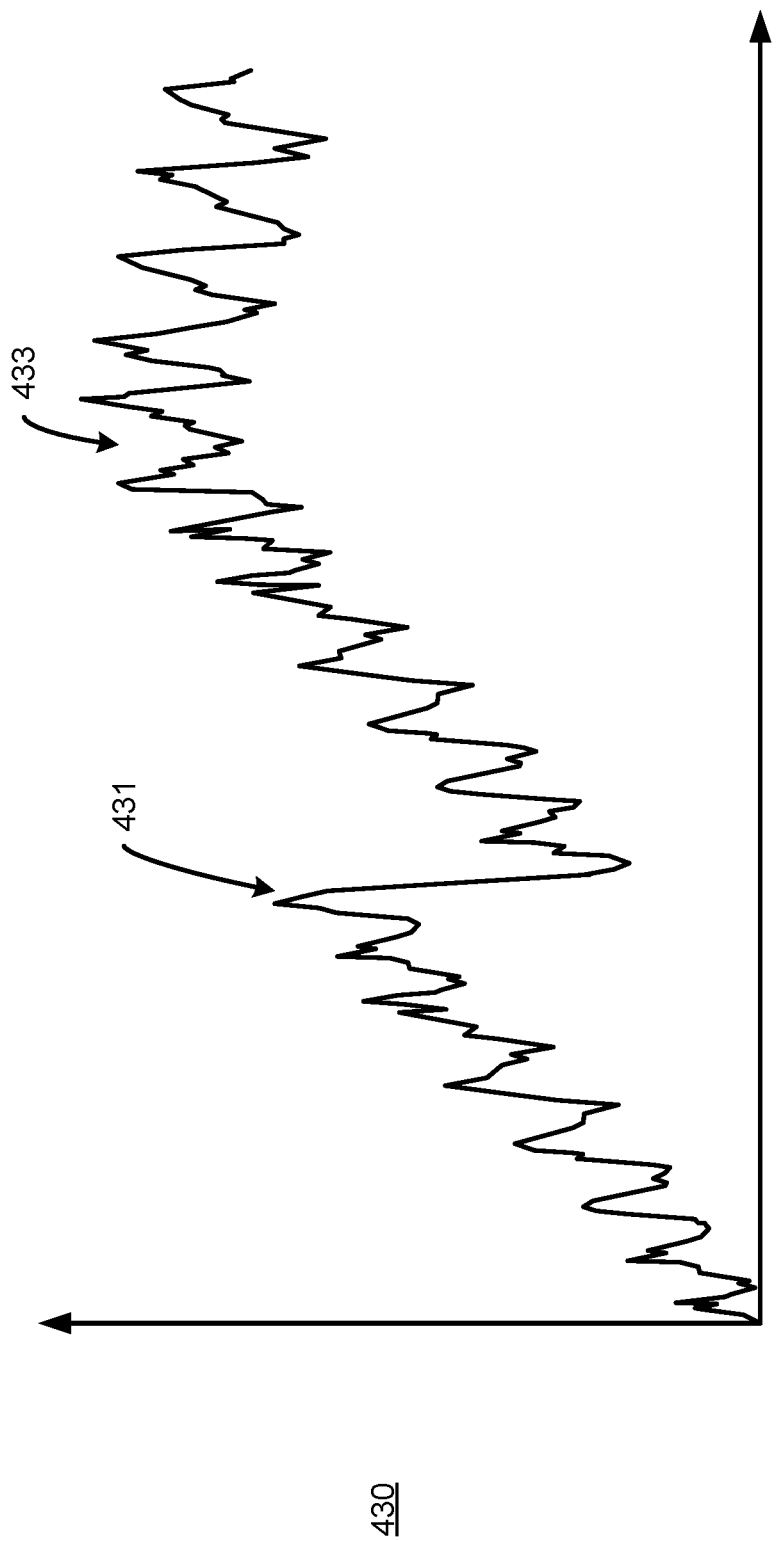

FIG. 4B illustrates generation of a synthetic time series dataset having change points, in accordance with one or more embodiments. In particular, FIG. 4B illustrates a synthetic time series dataset 430 having change points. In some embodiments, synthetic time series dataset 430 may be a subset of a larger graph. In some embodiments, synthetic time series dataset 430 may represent an aggregation of seasonality component 400, trend component 410, and noise component 420. For example, each point in synthetic time series dataset 430 may be a combination (e.g., sum, product, or other combination) of seasonality component 400, trend component 410, and noise component 420. As an illustrative example, synthetic time series dataset 430 may represent application numbers for admission to a program over time. For example, synthetic time series dataset 430 may illustrate application numbers over twenty-two years. Synthetic time series dataset 430 may include a seasonality component (e.g., seasonality component 400), which increases during application season and decreases between application cycles. In some embodiments, the seasonality illustrated in synthetic time series dataset 430 may be additive. More people may apply during each winter because they are planning for the next academic year. This seasonal factor may add an extra 5,000 applicants every winter, regardless of the year. In this case, the seasonality is additive because the seasonal effect (additional applicants) remains constant across years. Thus, data aggregation subsystem 120 adds seasonality component 400 and trend component 410 during the aggregation process. Synthetic time series dataset 430 may include a trend component (e.g., trend component 410), which varies over time. Synthetic time series dataset 430 may also include a noise component (e.g., noise component 420). For example, noise in applications to a program may include fluctuations in application numbers that are not attributable to seasonality, trend, or other components. A brief server outage on the application portal may lead to a minor drop in applications for a short time period. A popular figure mentioning the program publicly may cause temporary, unpredictable surges.

In some embodiments, synthetic time series dataset 430 may include change point 431 and change point 433. In some embodiments, synthetic time series dataset 430 may include additional change points. In some embodiments, change point 431 and change point 433 may correspond to change point 411 and change point 413, as shown in FIG. 4A. As an example, each change point represents a change to a tendency of the data over time. For example, change point 431 may be caused by the program dropping in a prominent ranking from a top ranking to a mediocre ranking. The program may retain its gradual increase in popularity over time, but the drop in rankings may nonetheless cause change point 431. Change point 433 may be caused by an international decrease in demand for a degree associated with the program. The decrease in demand may cause a perceived value of the program to decrease. The program may, from change point 433 onward, gradually decrease in popularity due to the decrease in demand. In some embodiments, change points may represent other changes to tendencies in the data over time.

In some embodiments, data aggregation subsystem 120 may include one or more labels with synthetic time series dataset 430. For example, the labels may identify features of synthetic time series dataset 430, such as change points or other irregularities. In some embodiments, a label may be a feature vector that describes the irregularities of the synthetic time series dataset. Models may rely upon these labels as feedback on performance during training, testing, or benchmarking. As an example, a label may be {"change_point_count": 2, "change_point_positions": [3122, 5947]}. In some embodiments, labels may also identify the components of synthetic time series dataset 430 and characteristics of those components. In some embodiments, other types of labels may be used.

These processes may be used individually or in conjunction with each other and with any other processes for generating synthetic datasets. For example, some embodiments involve generating the synthetic time series dataset having anomalies and change points. In particular, data generation subsystem 116 may generate the synthetic time series dataset using a first harmonic function, a first trend function, and a first noise function. Data modification subsystem 118 may generate one or more anomalies by replacing values of one or more data points in the noise component with one or more values within a range of variance for anomalies (e.g., between a minimum anomaly variance and a maximum anomaly variance). Data modification subsystem 118 may generate change points for the synthetic time series dataset by replacing, for a subset of consecutive time slots, corresponding data points of the trend component with a corresponding set of data points generated using a second trend function. Data aggregation subsystem 120 may then generate a synthetic time series dataset by combining the corresponding data points generated for the seasonality, trend, and noise components. In particular, data aggregation subsystem 120 may combine the seasonality data points, the first trend data points, and the noise data points for corresponding time slots and may combine the seasonality data points, the second trend data points, and the noise data points for the subset of consecutive time slots.

Figure 5:
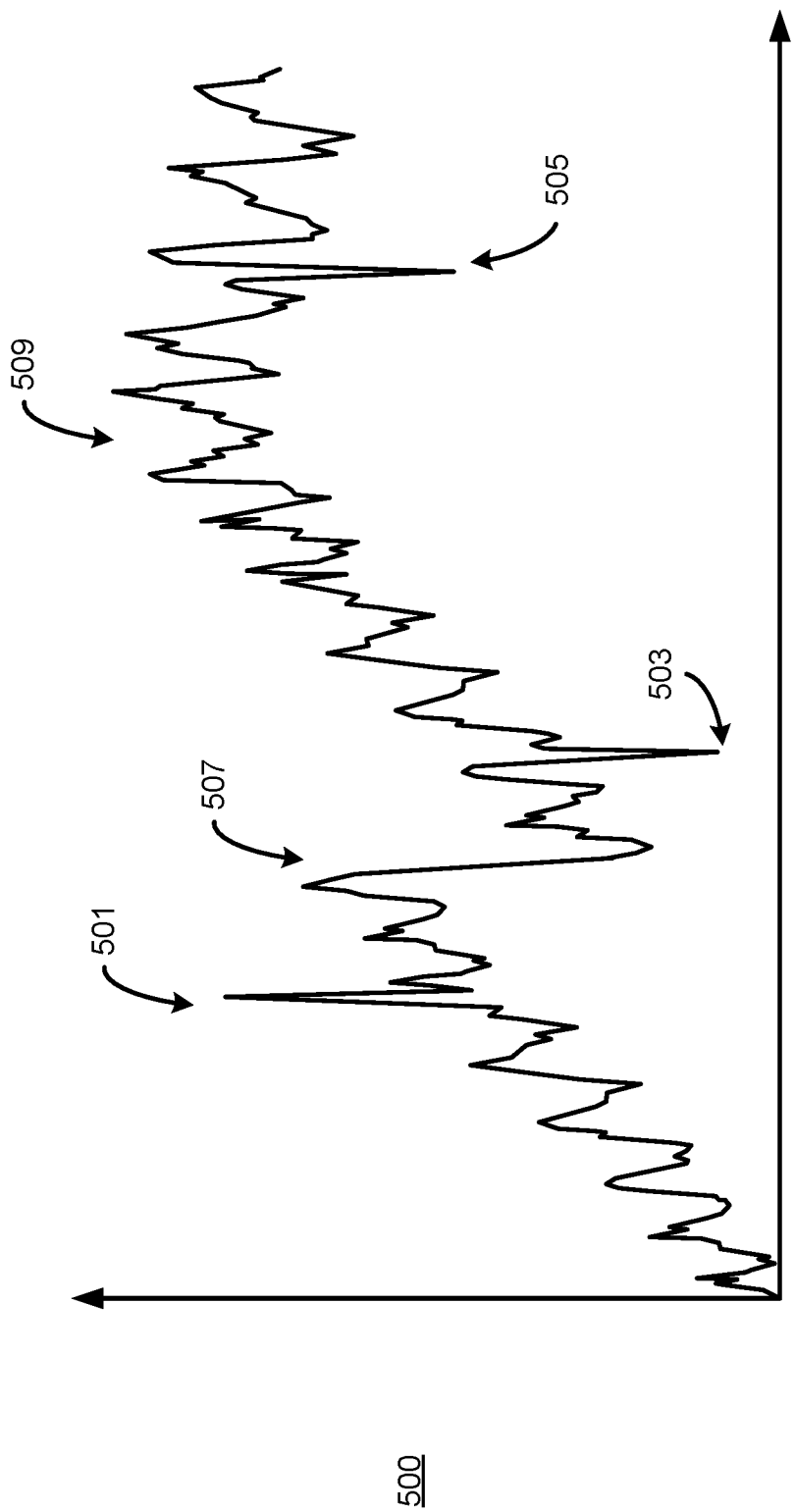
FIG. 5 illustrates a synthetic time series dataset having anomalies and change points, in accordance with one or more embodiments.

FIG. 5 illustrates a synthetic time series dataset having anomalies and change points, in accordance with one or more embodiments. In particular, FIG. 5 illustrates a synthetic time series dataset 500 having anomalies and change points. In some embodiments, synthetic time series dataset 500 may be a subset of a larger graph. In some embodiments, synthetic time series dataset 500 may represent an aggregation of a seasonality component, a trend component, and a noise component. For example, each point in synthetic time series dataset 500 may be a combination (e.g., sum, product, or other combination) of seasonality, trend, and noise. As an illustrative example, synthetic time series dataset 500 may represent application numbers for admission to a program over time. For example, synthetic time series dataset 500 may illustrate application numbers over twenty-two years. Synthetic time series dataset 500 may include a seasonality component, which increases during application season and decreases between application cycles. Synthetic time series dataset 500 may include a trend component, which varies over time. Synthetic time series dataset 340 may also include a noise component.

In some embodiments, synthetic time series dataset 500 may include anomaly 501, anomaly 503, and anomaly 505. In some embodiments, synthetic time series dataset 500 may include additional anomalies. In some embodiments, anomaly 501, anomaly 503, and anomaly 505 may correspond to anomaly 341, anomaly 343, and anomaly 345, as shown in FIG. 3C. As an example, each anomaly represents something unusual, unexpected, or not conforming to a normal pattern. In some embodiments, synthetic time series dataset 500 may include change point 507 and change point 509. In some embodiments, synthetic time series dataset 500 may include additional change points. In some embodiments, change point 507 and change point 509 may correspond to change point 431 and change point 433, as shown in FIG. 4B. As an example, each change point represents a change to a tendency of the data over time.

In some embodiments, data aggregation subsystem 120 may include one or more labels with synthetic time series dataset 500. For example, the labels may identify features of synthetic time series dataset 500, such as anomalies, change points, and other irregularities. In some embodiments, a label may be a feature vector that describes the irregularities of the synthetic time series dataset. Models may rely upon these labels as feedback on performance during training, testing, or benchmarking. As an example, a label may be {"anomaly_count": 3, "anomaly_positions": [2375, 4065, 7300], "change_point_count": 2, "change_point_positions":

[3122, 5947]}. In some embodiments, labels may also identify the various components of synthetic time series dataset 500 and characteristics of those components.

Computing Environment

Figure 6:
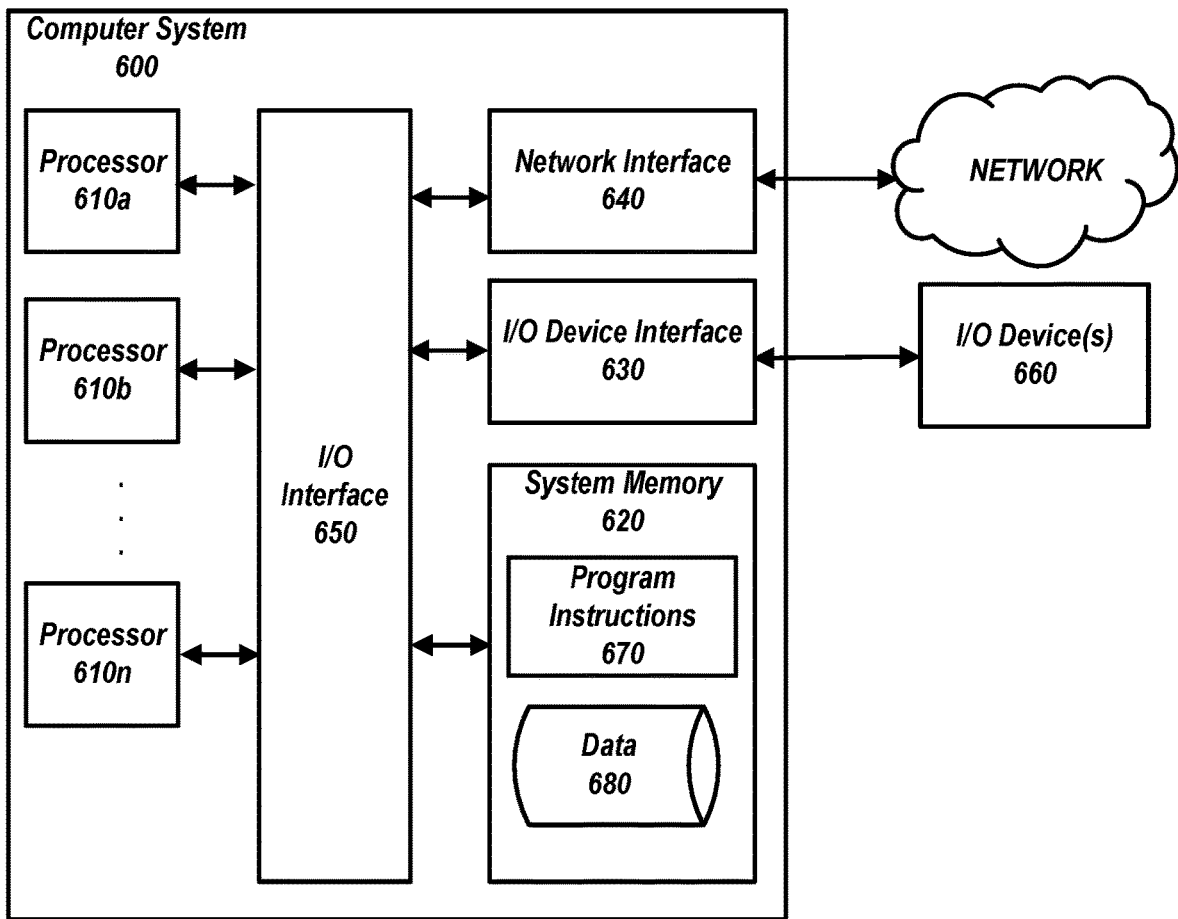
FIG. 6 illustrates a computing device, in accordance with one or more embodiments.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehicle-mounted computer, a Global Positioning System (GPS), or the like. Computing system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
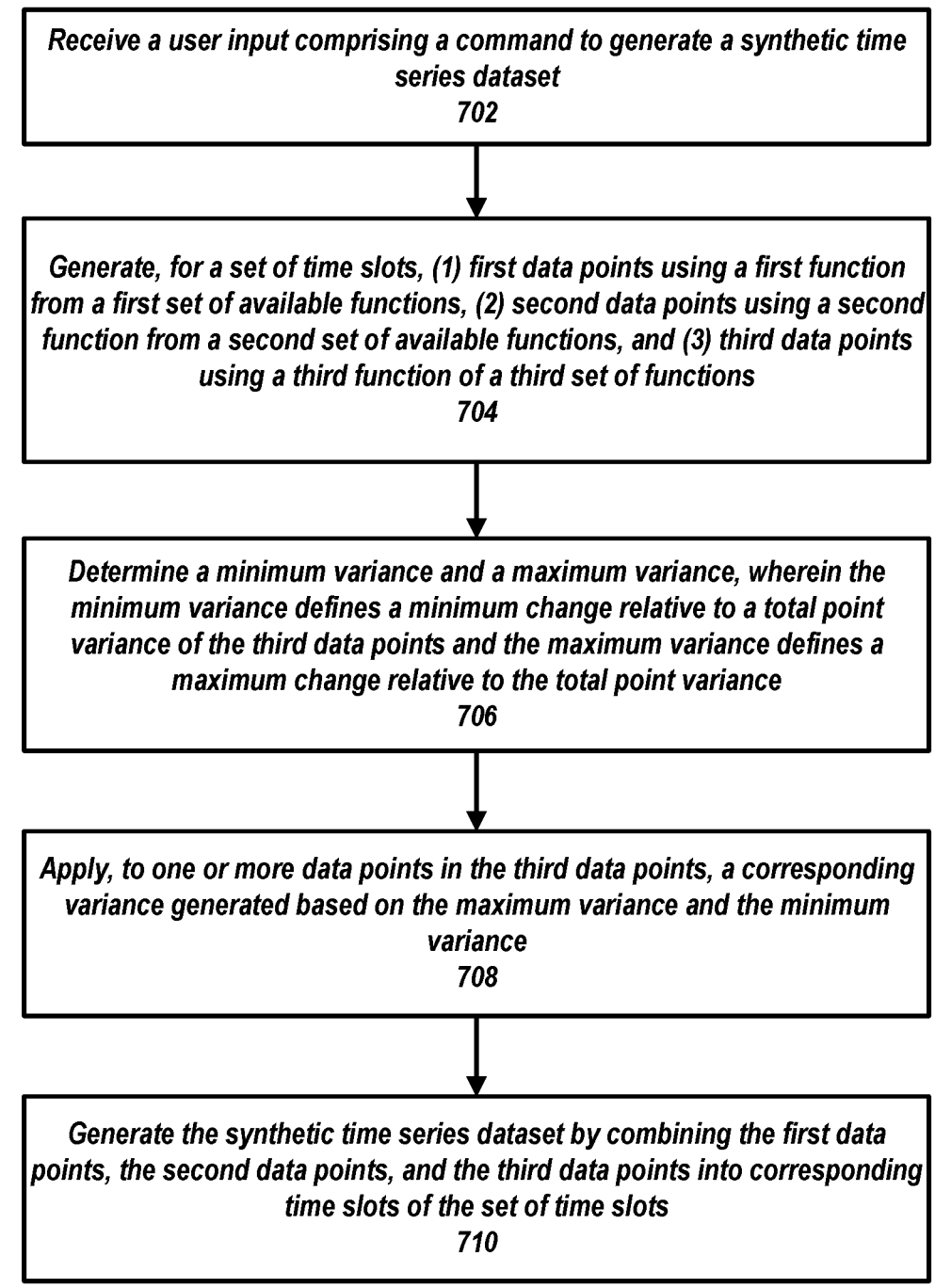
FIG. 7 shows a flowchart of the process for generating a synthetic time series dataset having anomalies, in accordance with one or more embodiments.
Figure 8:
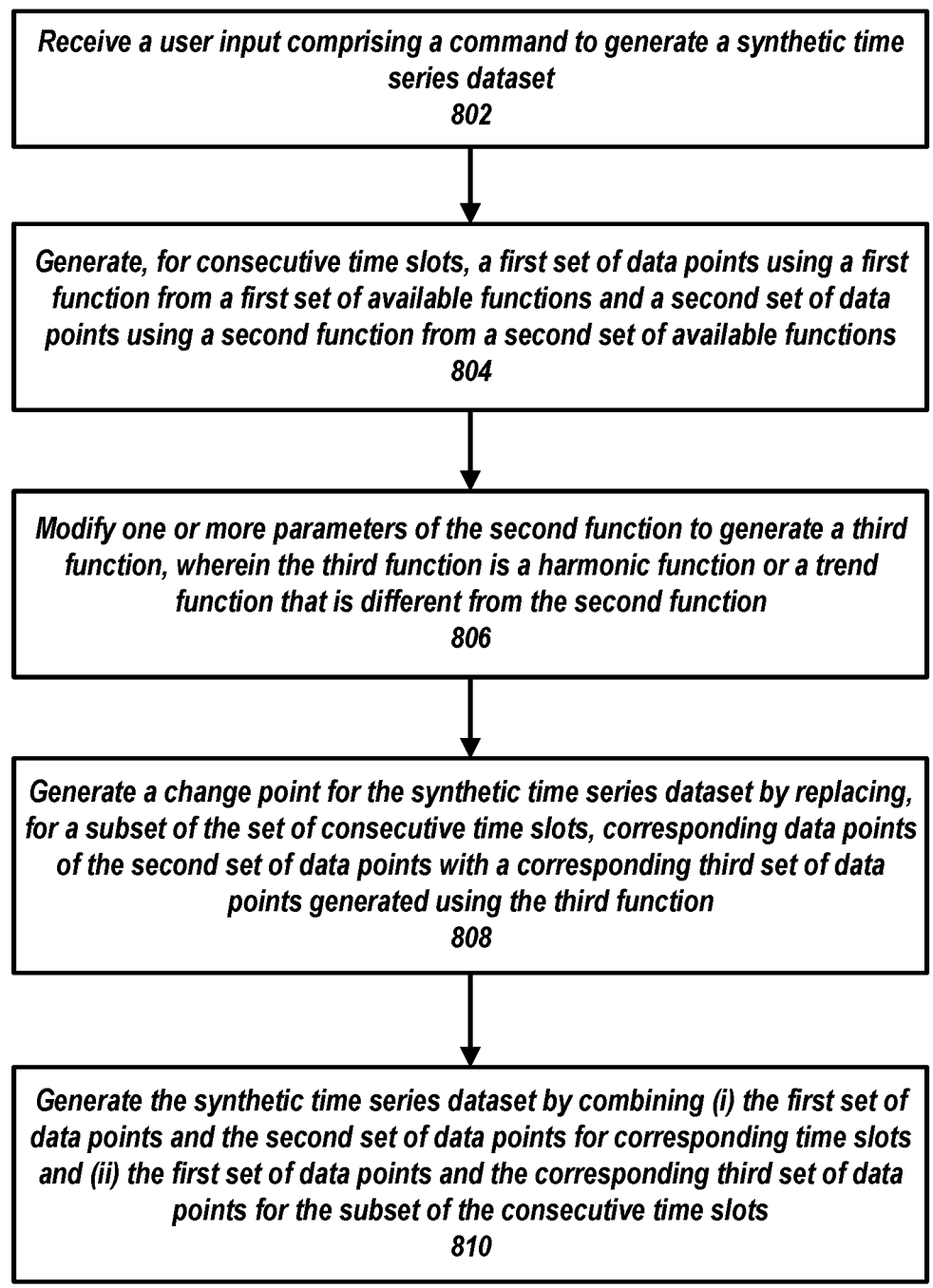
FIG. 8 shows a flowchart of the process for generating a synthetic time series dataset having change points, in accordance with one or more embodiments.

FIGS. 7-8 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

The methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 7 shows a flowchart of the process 700 for generating a synthetic time series dataset having anomalies, in accordance with one or more embodiments. For example, the system may use process 700 (e.g., as implemented on one or more system components described above) to generate a synthetic time series dataset for use in training or benchmarking machine learning models used to identify anomalies in datasets.

At 702, system 102 (e.g., using one or more of processors 610a-610n) may receive a user input comprising a command to generate a synthetic time series dataset. In some embodiments, system 102 may receive one or more parameters with the user input. For example, the parameters may specify a percentage of anomalies, a variance range for anomalies, or other parameters. System 102 may receive the user input using one or more of network interface 640, I/O devices 660, or a network.

At 704, system 102 (e.g., using one or more of processors 610a-610n) may generate, for a set of time slots, sets of data points for the synthetic time series dataset. System 102 may generate, for a set of time slots, (1) first data points using a first function from a first set of available functions, (2) second data points using a second function from a second set of available functions, and (3) third data points using a third function of a third set of functions. System 102 may generate the sets of data points using one or more of processors 610a-610n and may obtain the data from system memory 620 or data 680.

At 706, system 102 (e.g., using one or more of processors 610a-610n) may determine a minimum variance and a maximum variance. The minimum variance may define a minimum change relative to a total point variance of the third data points and the maximum variance may define a maximum change relative to the total point variance. System 102 may determine the minimum variance and the maximum variance using one or more of processors 610a-610n.

At 708, system 102 (e.g., using one or more of processors 610a-610n) may apply, to one or more data points in the third data points, a corresponding variance generated based on the maximum variance and the minimum variance. For example, system 102 may replace values of one or more data points with one or more values between the maximum variance and the minimum variance. In some embodiments, the one or more values may be evenly distributed between the maximum variance and the minimum variance. System 102 may apply the corresponding variance using one or more of processors 610a-610n.

At 710, system 102 (e.g., using one or more of processors 610a-610n) may generate the synthetic time series dataset by combining the first data points, the second data points, and the third data points into corresponding time slots of the time slots. For example, system 102 may aggregate the values of corresponding data points from the first data points, the second data points, and the third data points. In some embodiments, aggregating may involve adding the values or multiplying the values. System 102 may generate the synthetic time series dataset using one or more of processors 610a-610n.

FIG. 8 shows a flowchart of the process 800 for generating a synthetic time series dataset having change points, in accordance with one or more embodiments. For example, the system may use process 800 (e.g., as implemented on one or more system components described above) to generate a synthetic time series dataset for use in training or benchmarking machine learning models used to identify change points in datasets.

At 802, system 102 (e.g., using one or more of processors 610a-610n) may receive a user input comprising a command to generate a synthetic time series dataset. In some embodiments, system 102 may receive one or more parameters with the user input. For example, the parameters may specify a percentage of change points or other parameters. System 102 may receive the user input using one or more of network interface 640, I/O devices 660, or a network.

At 804, system 102 (e.g., using one or more of processors 610a-610n) may generate, for consecutive time slots, sets of data points for the synthetic time series dataset. System 102 may generate, for example, first data points using a first function from a first set of available functions and second data points using a second function from a second set of available functions. In some embodiments, one of the first function or the second function may be harmonic and the other of the first function or the second function may denote trend. System 102 may generate the sets of data points using one or more of processors 610a-610n and may obtain the data from system memory 620 or data 680.

At 806, system 102 (e.g., using one or more of processors 610a-610n) may modify one or more parameters of the second function to generate a third function. For example, the third function may be a harmonic function or a trend function that is different from the second function. In some embodiments, system 102 may modify the parameters using one or more of processors 610a-610n.

At 808, system 102 (e.g., using one or more of processors 610a-610n) may generate a change point for the synthetic time series dataset by replacing, for a subset of the consecutive time slots, corresponding data points of the second set of data points with a corresponding third set of data points generated using the third function. For example, system 102 may change the trend function for a portion of the consecutive time slots of the synthetic time series dataset. System 102 may generate the change point using one or more of processors 610a-610n.

At 810, system 102 (e.g., using one or more of processors 610a-610n) may generate the synthetic time series dataset by combining (i) the first set of data points and the second set of data points for corresponding time slots and (ii) the first set of data points and the corresponding third set of data points for the subset of the consecutive time slots. For example, system 102 may combine the original trend function and the original harmonic function for consecutive time slots of the synthetic time series dataset. System 102 may then combine the original trend function with the modified harmonic function or the modified trend function with the original harmonic function for a subset of the synthetic time series dataset. System 102 may generate the synthetic time series dataset using one or more of processors 610a-610n.

It is contemplated that the steps or descriptions of FIGS. 7-8 may be used with any other embodiment of this disclosure. In addition, the steps and descriptions described in relation to FIGS. 7-8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIGS. 7-8.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This patent application is one of a set of patent applications filed on the same day by the same applicant. These patent applications have the following titles: GENERATING SYNTHETIC TIME SERIES DATASETS HAVING ANOMALIES U.S. patent application Ser. No. 18/517,557) and GENERATING SYNTHETIC TIME SERIES DATASETS HAVING CHANGE POINTS patent application Ser. No. 18/517,700). The entire contents of each of the foregoing other patent applications are hereby incorporated by reference.

The present techniques will be better understood with reference to the following enumerated embodiments:

1. A method comprising receiving a user input comprising a command to generate a synthetic time series dataset, generating, for a plurality of time slots of the synthetic time series dataset, (1) a first plurality of data points using a first function from a first plurality of available functions, (2) a second plurality of data points using a second function from a second plurality of available functions, and (3) a third plurality of data points using a third function from a third plurality of functions, determining a minimum anomaly variance and a maximum anomaly variance for generating one or more anomalies for the synthetic time series dataset, wherein the minimum anomaly variance defines a minimum change of an anomaly relative to a point variance of the third plurality of data points and the maximum anomaly variance defines a maximum change of the anomaly relative to the point variance of the third plurality of data points, generating the one or more anomalies based on applying, to one or more data points in the third plurality of data points, a corresponding anomaly variance generated based on the maximum anomaly variance and the minimum anomaly variance, and generating, according to the plurality of time slots, the synthetic time series dataset comprising the one or more anomalies by combining the first plurality of data points, the second plurality of data points, and the third plurality of data points into corresponding time slots of the plurality of time slots.

2. The method of any one of the preceding embodiments, further comprising determining, based on the user input, a percentage of anomalies and a time period for anomalies to be generated for the synthetic time series dataset, and determining, based on the percentage and the time period, a number of anomalies to generate within the synthetic time series dataset.

3. The method of any one of the preceding embodiments, further comprising retrieving, from the user input, a minimum distribution for the one or more anomalies, wherein the minimum distribution comprises a minimum number of time slots between any two anomalies within the synthetic time series dataset, and determining one or more time slots of the one or more data points to update based on the number of anomalies such that the one or more time slots satisfy the minimum distribution for the one or more anomalies relative to each other.

4. The method of any one of the preceding embodiments, further comprising determining one or more random time slots of the one or more data points to update based on the number of anomalies.

5. The method of any one of the preceding embodiments, wherein the minimum anomaly variance comprises a first number of standard deviations of the point variance of the third plurality of data points and the maximum anomaly variance comprises a second number of standard deviations of the point variance of the third plurality of data points, wherein the second number of standard deviations is greater than the first number of standard deviations.

6. The method of any one of the preceding embodiments, further comprising determining that a first data point of the third plurality of data points has a first value that exceeds the minimum anomaly variance, and based on determining that the first data point has the first value that exceeds the minimum anomaly variance, replacing the first value with a new value that is equal to the minimum anomaly variance.

7. The method of any one of the preceding embodiments, further comprising retrieving, from the user input, an update parameter that defines the minimum anomaly variance and the maximum anomaly variance for generating the one or more anomalies within the synthetic time series dataset, wherein generating the one or more anomalies by updating the one or more data points comprises applying the update parameter to update the one or more data points.

8. The method of any one of the preceding embodiments, wherein generating the synthetic time series dataset comprises identifying, for each time slot of the plurality of time slots, (1) a corresponding first data point within the first plurality of data points, (2) a corresponding second data point within the second plurality of data points, and (3) a corresponding third data point within the third plurality of data points, and aggregating the corresponding first data point, the corresponding second data point, and the corresponding third data point into each corresponding time slot, wherein aggregating comprises adding magnitudes of the corresponding first data point, the corresponding second data point, and the corresponding third data point.

9. The method of any one of the preceding embodiments, wherein generating the synthetic time series dataset comprises identifying, for each time slot of the plurality of time slots, (1) a corresponding first data point within the first plurality of data points, (2) a corresponding second data point within the second plurality of data points, and (3) a corresponding third data point within the third plurality of data points, and aggregating the corresponding first data point, the corresponding second data point, and the corresponding third data point into each corresponding time slot, wherein aggregating comprises adding a magnitude of the corresponding third data point to a product of the corresponding first data point and the corresponding second data point.

10. The method of any one of the preceding embodiments, further comprising scaling the third plurality of data points such that a relationship between the second plurality of data points and the third plurality of data points satisfies a ratio retrieved from the user input, wherein the ratio balances the relationship.

11. The method of any one of the preceding embodiments, wherein generating the one or more anomalies comprises applying the corresponding anomaly variance to the one or more data points in the third plurality of data points, wherein each corresponding anomaly variance is evenly distributed between the minimum anomaly variance and the maximum anomaly variance.

12. A method comprising receiving a user input comprising a command to generate a synthetic time series dataset, generating data points for a plurality of consecutive time slots of the synthetic time series dataset using functions, wherein a first plurality of data points is generated using a first function from a first plurality of available functions and a second plurality of data points is generated using a second function from a second plurality of available functions, and wherein one of the first function or the second function is harmonic and another one of the first function or the second function denotes trend, modifying one or more parameters of the second function to generate a third function, wherein the third function is a harmonic function or a trend function that is different from the second function, generating a change point for the synthetic time series dataset by replacing, for a subset of the plurality of consecutive time slots, corresponding data points of the second plurality of data points with a corresponding third plurality of data points generated using the third function, and generating the synthetic time series dataset comprising the change point by combining (i) the first plurality of data points and the second plurality of data points for corresponding time slots of the plurality of consecutive time slots and (ii) the first plurality of data points and the corresponding third plurality of data points for the subset of the plurality of consecutive time slots.

13. The method of any one of the preceding embodiments, wherein the second function denotes trend, and wherein modifying the second function comprises modifying a level or a slope associated with the second function.

14. The method of any one of the preceding embodiments, wherein the second function is harmonic, and wherein modifying the second function comprises modifying a period or an amplitude associated with the second function.

15. The method of any one of the preceding embodiments, further comprising determining, based on the user input, a percentage of change points and a time period for change points to be generated for the synthetic time series dataset, and determining, based on the percentage and the time period, a number of change points to generate within the synthetic time series dataset, wherein the number of change points to generate within the synthetic time series dataset comprises the change point.

16. The method of any one of the preceding embodiments, further comprising retrieving, from the user input, a minimum distribution for change points, wherein the minimum distribution comprises a minimum number of time slots between any two change points within the synthetic time series dataset, and determining one or more time slots at which to generate the change points based on the number of change points such that the one or more time slots satisfy the minimum distribution for the change points relative to each other.

17. The method of any one of the preceding embodiments, further comprising scaling the first plurality of data points or the second plurality of data points, wherein a relationship between the first plurality of data points and the second plurality of data points satisfies a ratio retrieved from the user input.

18. The method of any one of the preceding embodiments, wherein generating the synthetic time series dataset comprises identifying, for each corresponding time slot of the plurality of consecutive time slots, a corresponding first data point within the first plurality of data points and a corresponding second data point within the second plurality of data points, identifying, for each time slot of the subset of the plurality of consecutive time slots, a corresponding third data point within the first plurality of data points and a corresponding fourth data point within the corresponding third plurality of data points, and aggregating (i) the corresponding first data point and the corresponding second data point for each corresponding time slot of the plurality of consecutive time slots and (ii) the corresponding third data point and the corresponding fourth data point for the subset of the plurality of consecutive time slots, wherein aggregating comprises adding magnitudes of corresponding data points.

19. The method of any one of the preceding embodiments, wherein generating the synthetic time series dataset comprises identifying, for each corresponding time slot of the plurality of consecutive time slots, a corresponding first data point within the first plurality of data points and a corresponding second data point within the second plurality of data points, identifying, for each time slot of the subset of the plurality of consecutive time slots, a corresponding third data point within the first plurality of data points and a corresponding fourth data point within the corresponding third plurality of data points, and aggregating (i) the corresponding first data point and the corresponding second data point for each corresponding time slot of the plurality of consecutive time slots and (ii) the corresponding third data point and the corresponding fourth data point for the subset of the plurality of consecutive time slots, wherein aggregating comprises multiplying magnitudes of corresponding data points.

20. The method of any one of the preceding embodiments, further comprising generating a fourth plurality of data points using a fourth function from a fourth plurality of available functions, wherein the fourth function is a noise function and the fourth plurality of available functions comprise Gaussian functions and auto-regressive functions.

21. The method of any one of the preceding embodiments, further comprising generating the synthetic time series dataset comprising the change point by combining (i) the first plurality of data points, the second plurality of data points, and the fourth plurality of data points for corresponding time slots of the plurality of consecutive time slots and (ii) the first plurality of data points, the corresponding third plurality of data points, and the fourth plurality of data points for the subset of the plurality of consecutive time slots.

22. The method of any one of the preceding embodiments, wherein the synthetic time series dataset comprises a plurality of data points for a plurality of equal time periods.

23. A method comprising receiving a user input comprising a command to generate a synthetic time series dataset, generating, for a plurality of consecutive time slots of the synthetic time series dataset, a first plurality of data points using a first function from a first plurality of available functions and a second plurality of data points using a second function from a second plurality of available functions, modifying one or more data points of the second plurality of data points, and generating the synthetic time series dataset by combining the first plurality of data points and the second plurality of data points for the plurality of consecutive time slots.

24. One or more tangible, non-transitory, machine-readable media storing instructions that, when executed by one or more data processing apparatuses, cause operations comprising those of any of embodiments 1-23.

25. A system comprising one or more processors; and memory storing instructions that, when executed by the processors, cause the processors to effectuate operations comprising those of any of embodiments 1-23.

26. A system comprising means for performing any of embodiments 1-23.

27. A system comprising cloud-based circuitry for performing any of embodiments 1-23.

What is claimed is:

1. A system for generating synthetic time series datasets having anomalies, the system comprising:
one or more processors and one or more non-transitory computer-readable media having computer-executable instructions stored thereon, the computer-executable instructions, when executed by the one or more processors, causing operations comprising:
receiving a user input comprising a plurality of parameters for generating a synthetic time series dataset, wherein the synthetic time series dataset comprises a plurality of data points for a plurality of equal time periods;
generating, for a plurality of time slots of the synthetic time series dataset, (1) a first plurality of data points using a first harmonic function from a plurality of available harmonic functions, (2) a second plurality of data points for the synthetic time series dataset using a first trend function from a plurality of available trend functions, and (3) a third plurality of data points using a first noise function of a plurality of noise-generating functions, wherein a relationship between the second plurality of data points and the third plurality of data points satisfies a ratio retrieved from the plurality of parameters, and wherein the plurality of noise-generating functions comprises Gaussian functions and auto-regressive functions;
determining a point variance of the third plurality of data points, wherein the point variance comprises a measure of variance of the third plurality of data points;
determining, based on the plurality of parameters, a minimum anomaly variance and a maximum anomaly variance, wherein the minimum anomaly variance defines a minimum change of anomalies relative to the point variance and the maximum anomaly variance defines a maximum change of the anomalies relative to the point variance;
generating one or more anomalies based on applying corresponding anomaly variance to one or more data points in the third plurality of data points, wherein each corresponding anomaly variance is between the minimum anomaly variance and the maximum anomaly variance;
storing the synthetic time series dataset comprising the one or more anomalies by combining the first plurality of data points, the second plurality of data points, and the third plurality of data points into corresponding time slots of the plurality of time slots, wherein the synthetic time series dataset does not include original information included in authentic data; and
training or benchmarking, using the synthetic time series dataset, a machine learning model used to identify anomalies.

2. A method comprising:
receiving a user input comprising a command to generate a synthetic time series dataset;
determining, based on the user input, a percentage of anomalies and a time period for anomalies to be generated for the synthetic time series dataset;

determining, based on the percentage and the time period, a number of anomalies to generate within the synthetic time series dataset;

generating, for a plurality of time slots of the synthetic time series dataset, (1) a first plurality of data points using a first function from a first plurality of available functions, (2) a second plurality of data points using a second function from a second plurality of available functions, and (3) a third plurality of data points using a third function from a third plurality of functions;

determining a minimum anomaly variance and a maximum anomaly variance for generating one or more anomalies for the synthetic time series dataset, wherein the minimum anomaly variance defines a minimum change of an anomaly relative to a point variance of the third plurality of data points and the maximum anomaly variance defines a maximum change of the anomaly relative to the point variance of the third plurality of data points;

generating the one or more anomalies based on applying, to one or more data points in the third plurality of data points, a corresponding anomaly variance generated based on the maximum anomaly variance and the minimum anomaly variance, and, the number of anomalies;

storing, according to the plurality of time slots, the synthetic time series dataset comprising the one or more anomalies by combining the first plurality of data points, the second plurality of data points, and the third plurality of data points into corresponding time slots of the plurality of time slots, wherein the synthetic time series dataset does not include original information included in authentic data; and training or benchmarking, using the synthetic time series dataset, a machine learning model used to identify anomalies.

3. The method of claim 2, further comprising:
retrieving, from the user input, a minimum distribution for the one or more anomalies, wherein the minimum distribution comprises a minimum number of time slots between any two anomalies within the synthetic time series dataset; and determining one or more time slots of the one or more data points to update based on the number of anomalies such that the one or more time slots satisfy the minimum distribution for the one or more anomalies relative to each other.

4. The method of claim 2, further comprising determining one or more random time slots of the one or more data points to update based on the number of anomalies.

5. The method of claim 2, wherein the minimum anomaly variance comprises a first number of standard deviations of the point variance of the third plurality of data points and the maximum anomaly variance comprises a second number of standard deviations of the point variance of the third plurality of data points, wherein the second number of standard deviations is greater than the first number of standard deviations.

6. The method of claim 2, further comprising:
determining that a first data point of the third plurality of data points has a first value that exceeds the minimum anomaly variance; and based on the first data point having the first value that exceeds the minimum anomaly variance, replacing the first value with a new value that is equal to the minimum anomaly variance.

7. The method of claim 2, further comprising:
retrieving, from the user input, an update parameter that defines the minimum anomaly variance and the maximum anomaly variance, wherein the generating the one or more anomalies by updating the one or more data points comprises applying the update parameter to update the one or more data points.

8. The method of claim 2, wherein the storing the synthetic time series dataset comprises:
identifying, for each time slot of the plurality of time slots, (1) a corresponding first data point within the first plurality of data points, (2) a corresponding second data point within the second plurality of data points, and (3) a corresponding third data point within the third plurality of data points; and aggregating the corresponding first data point, the corresponding second data point, and the corresponding third data point into each corresponding time slot, wherein the aggregating comprises adding magnitudes of the corresponding first data point, the corresponding second data point, and the corresponding third data point.

9. The method of claim 2, wherein the storing the synthetic time series dataset comprises:
identifying, for each time slot of the plurality of time slots, (1) a corresponding first data point within the first plurality of data points, (2) a corresponding second data point within the second plurality of data points, and (3) a corresponding third data point within the third plurality of data points; and aggregating the corresponding first data point, the corresponding second data point, and the corresponding third data point into each corresponding time slot, wherein the aggregating comprises adding a magnitude of the corresponding third data point to a product of the corresponding first data point and the corresponding second data point.

10. The method of claim 2, further comprising scaling the third plurality of data points such that a relationship between the second plurality of data points and the third plurality of data points satisfies a ratio retrieved from the user input, wherein the ratio balances the relationship.

11. The method of claim 2, wherein the generating the one or more anomalies comprises applying the corresponding anomaly variance to the one or more data points in the third plurality of data points, wherein each corresponding anomaly variance is evenly distributed between the minimum anomaly variance and the maximum anomaly variance.

12. One or more non-transitory, computer-readable media storing instructions that, when executed by one or more processors, cause operations comprising:
receiving a user input comprising a command to generate a synthetic time series dataset;

generating, for a plurality of time slots of the synthetic time series dataset, (1) a first plurality of data points using a first function from a first plurality of available functions, (2) a second plurality of data points using a second function from a second plurality of available functions, and (3) a third plurality of data points using a third function of a third plurality of functions;

scaling the third plurality of data points such that a relationship between the second plurality of data points and the third plurality of data points satisfies a ratio retrieved from the user input, wherein the ratio balances the relationship;

determining a minimum variance and a maximum variance, wherein the minimum variance defines a minimum change relative to a total point variance of the third plurality of data points and the maximum variance defines a maximum change relative to the total point variance of the third plurality of data points;

applying, to one or more data points in the third plurality of data points, a corresponding variance generated based on the maximum variance and the minimum variance;

storing the synthetic time series dataset by combining the first plurality of data points, the second plurality of data points, and the third plurality of data points into corresponding time slots of the plurality of time slots, wherein the synthetic time series dataset does not include original information included in authentic data; and training or benchmarking, using the synthetic time series dataset, a machine learning model used to identify anomalies.

13. The one or more non-transitory, computer-readable media of claim 12, wherein the instructions further cause the one or more processors to perform operations comprising:

retrieving, from the user input, a percentage and a time period associated with the command; and determining, based on the percentage and the time period, a number of the one or more data points to update within the synthetic time series dataset.

14. The one or more non-transitory, computer-readable media of claim 13, wherein the instructions further cause the one or more processors to perform operations comprising:

retrieving, from the user input, a minimum distribution for the one or more data points to update, wherein the minimum distribution comprises a minimum number of time slots between any two anomalies within the synthetic time series dataset; and determining one or more time slots of the one or more data points to update based on the number of the one or more data points such that the one or more time slots satisfy the minimum distribution relative to each other.

15. The one or more non-transitory, computer-readable media of claim 12, wherein the minimum variance comprises a first number of standard deviations of the total point variance of the third plurality of data points and the maximum variance comprises a second number of standard deviations of the total point variance of the third plurality of data points, wherein the second number of standard deviations is greater than the first number of standard deviations.

16. The one or more non-transitory, computer-readable media of claim 12, wherein the instructions further cause the one or more processors to perform operations comprising:

determining that a first data point of the third plurality of data points has a first value that exceeds the minimum variance; and based on the first data point having the first value that exceeds the minimum variance, replacing the first value with a new value that is equal to the minimum variance.

17. The one or more non-transitory, computer-readable media of claim 12, wherein, to perform the storing of the synthetic time series dataset, the instructions further cause the one or more processors to perform operations comprising:

identifying, for each time slot of the plurality of time slots, (1) a corresponding first data point within the first plurality of data points, (2) a corresponding second data point within the second plurality of data points, and (3) a corresponding third data point within the third plurality of data points; and aggregating the corresponding first data point, the corresponding second data point, and the corresponding third data point into each corresponding time slot, wherein the aggregating comprises adding magnitudes of the corresponding first data point, the corresponding second data point, and the corresponding third data point.

18. The one or more non-transitory, computer-readable media of claim 12, wherein, to perform the storing of the synthetic time series dataset, the instructions further cause the one or more processors to perform operations comprising:

identifying, for each time slot of the plurality of time slots, (1) a corresponding first data point within the first plurality of data points, (2) a corresponding second data point within the second plurality of data points, and (3) a corresponding third data point within the third plurality of data points; and aggregating the corresponding first data point, the corresponding second data point, and the corresponding third data point into each corresponding time slot, wherein the aggregating comprises adding a magnitude of the corresponding third data point to a product of the corresponding first data point and the corresponding second data point.

19. The method of claim 2, wherein the synthetic time series dataset mirrors characteristics and structures of the authentic data.

20. The method of claim 2, wherein the machine learning model is unsupervised.

* * * * *